United States Patent [19]

Inou et al.

[11] Patent Number: 5,982,421
[45] Date of Patent: *Nov. 9, 1999

[54] IMAGE-SHAKE CORRECTING DEVICE UTILIZING OPTICAL CORRECTING MEANS AND ELECTRONIC CORRECTING MEANS

[75] Inventors: Kazuya Inou, Tokyo; Kitahiro Kaneda, Kanagawa-ken, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/870,022

[22] Filed: Jun. 5, 1997

Related U.S. Application Data

[63] Continuation of application No. 08/350,096, Nov. 29, 1994, abandoned.

[30] Foreign Application Priority Data

Dec. 2, 1993 [JP] Japan ................................. 5-338792
Dec. 20, 1993 [JP] Japan ................................. 5-344976

[51] Int. Cl.[6] .................................................. H04N 5/232
[52] U.S. Cl. ............................................................ 348/208
[58] Field of Search ..................................... 348/208, 699, 348/231, 222

[56] References Cited

U.S. PATENT DOCUMENTS

| 2,829,557 | 4/1958 | Jensen ............................................ 88/34 |
| 2,959,088 | 11/1960 | Räntsch ........................................ 88/1 |
| 5,282,044 | 1/1994 | Misawa et al. ........................... 348/208 |
| 5,371,539 | 12/1994 | Okino et al. .............................. 348/208 |
| 5,386,264 | 1/1995 | Sekine et al. ............................. 348/208 |
| 5,867,213 | 2/1999 | Ouchi ........................................ 348/208 |

FOREIGN PATENT DOCUMENTS

| 0410419A2 | 7/1989 | European Pat. Off. . |
| 0481230A2 | 4/1992 | European Pat. Off. . |
| 63-166370 | 7/1988 | Japan . |
| 1078581 | 3/1989 | Japan . |

OTHER PUBLICATIONS

Kinugasa, et al., "Electronic Image Stabilizer for Video Camera Use", IEEE Transactions on Consumer Electronics, vol. 36, No. 3, Aug. 1990.

Patent Abstract of Japan, JP 1078581, vol. 13, No. 301, (E –785).

*Primary Examiner*—Wendy Garber
*Attorney, Agent, or Firm*—Fitzpatrick, Cella, Harper & Scinto

[57] ABSTRACT

An image-shake correcting device including a motion-vector detecting circuit for detecting a motion vector of an image in the horizontal and vertical directions thereof, an optical correcting device for optically correcting a movement of the image in the vertical direction thereof in accordance with the output of the motion-vector detecting circuit, an electronic correcting device for electronically correcting a movement of the image in the horizontal direction thereof in accordance with the output of the motion-vector detecting circuit, and a control circuit for selectively controlling the optical correcting device and the electronic correcting device in accordance with the state of movement of the image which is detected by the motion-vector detecting circuit.

5 Claims, 19 Drawing Sheets

F I G. 17
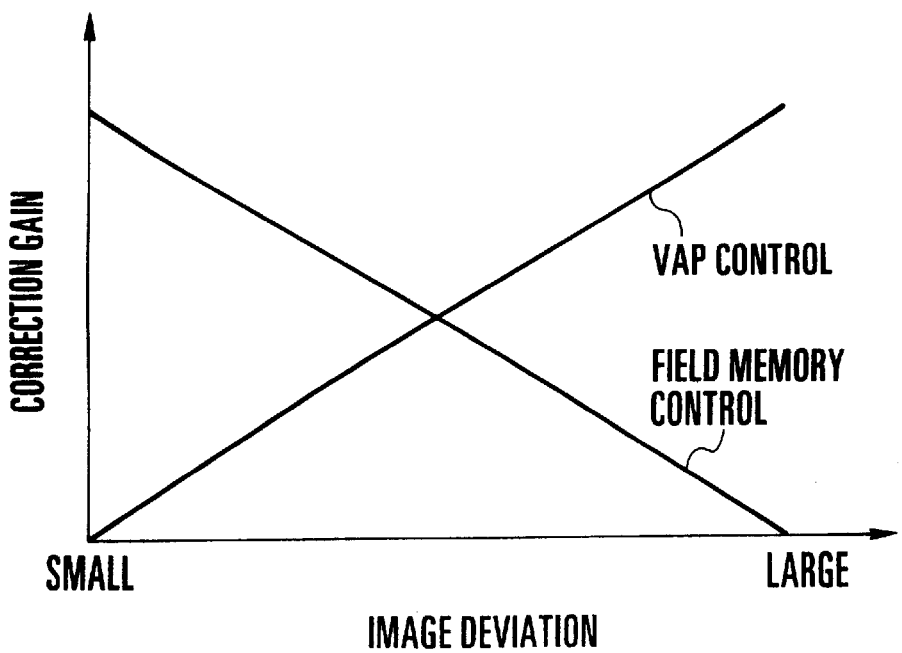
F I G. 18
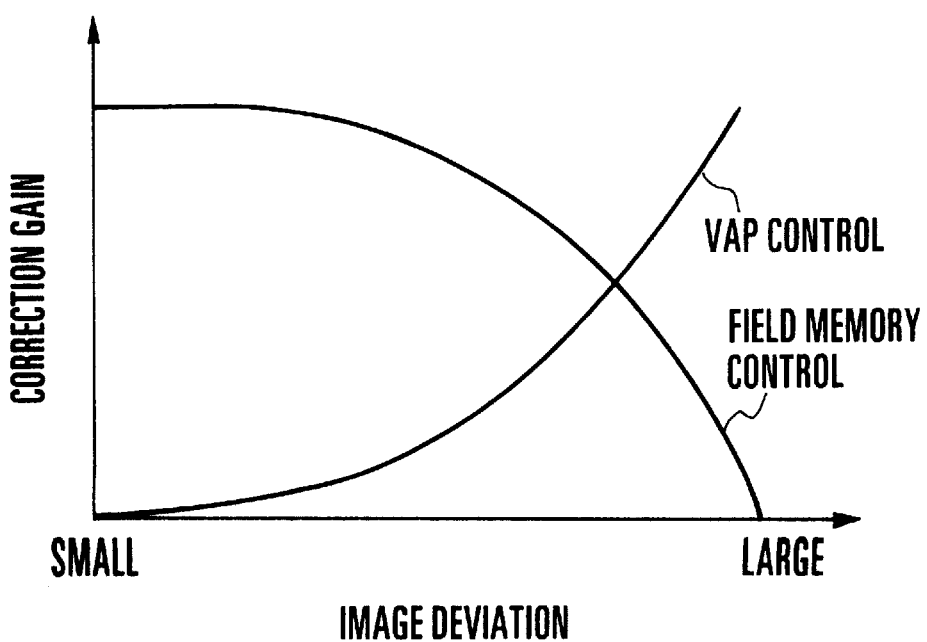

IMAGE-SHAKE CORRECTING DEVICE UTILIZING OPTICAL CORRECTING MEANS AND ELECTRONIC CORRECTING MEANS

This application is a continuation of application Ser. No. 08/350,096 filed Nov. 29, 1994, now abandoned.

BACKGROUND OF THE INVENTION

1. Field of the Invention

The present invention relates to an image-shake preventing device suitable for use in an image pickup apparatus, such as a video camera, and capable of correcting a shake (movement) of an image due to a vibration of the apparatus, or the like.

2. Description of the Related Art

An electronic correcting system, an optical correcting system and the like have heretofore been known as a system for correcting a shake of an image in this kind of image-shake preventing device. The electronic correcting system is generally arranged to store in a memory an input image which immediately precedes the current input image, detect a shake of an image by detecting a variation of the image from the current input image and the previous input image stored in the memory, and vary an image reading position in the memory from which to read out a cut-out image so as to cancel the shake, thereby correcting the shake of the image. The optical correcting system generally includes a variable angle prism disposed in front of a lens and is arranged to turn the variable angle prism and bend the optical axis thereof so as to cancel a shake of an image, thereby correcting the shake of the image.

FIG. 1 is a block diagram showing the arrangement of a video camera having an image-shake preventing device of the conventional, electronic correction type. The arrangement shown in FIG. 1 includes an optical system 1 made up of predetermined constituent components, such as a focusing lens group provided for the purpose of focusing, a zooming lens group for varying a focal length of the optical system 1, a compensation lens group, and an iris for adjusting the amount of light. An image pickup element 2 is made up of, for example, a two-dimensional CCD and is provided for converting an input light signal into an electrical signal and outputting the electrical signal. A sample-and-hold (S/H) circuit 3 is provided for sampling and holding the electrical signal supplied from the image pickup element 2, at intervals of a predetermined period, and an automatic gain control (AGC) circuit 4 is provided for controlling the gain of the electrical signal outputted from the S/H circuit 3.

The arrangement shown in FIG. 1 also includes an analog-to-digital (A/D) converter 5 for converting an analog signal outputted from the AGC circuit 4 into a digital signal, a Y/C separation circuit 6 for generating two kinds of delayed signals, i.e., a 1H delayed signal (H: horizontal synchronizing period) and a 2H delayed signal, from the signal outputted from the A/D converter 5, and for performing computations on the 1H and 2H delayed signals to separate the signal outputted from the A/D converter 5 into a chrominance signal C and a luminance signal Y. A C process circuit 7 is provided for generating the chrominance signal C from the 2H delayed signal outputted from the Y/C separation circuit 6, and a Y process circuit 8 is provided for generating the luminance signal Y from the 1H delayed signal outputted from the Y/C separation circuit 6 and performing edge enhancement, gamma correction and other predetermined processes on the luminance signal Y.

The arrangement shown in FIG. 1 also includes a first memory 9 for temporarily storing the chrominance signal C outputted from the C process circuit 7, a second memory 10 for temporarily storing the luminance signal Y outputted from the Y process circuit 8, a first digital-to-analog (D/A) converter 11 for converting the output signal (digital signal) of the first memory 9 into an analog signal, a second digital-to-analog (D/A) converter 12 for converting the output signal (digital signal) of the second memory 10 into an analog signal, a first signal output terminal 13 through which to output the signal outputted from the D/A converter 11, and a second signal output terminal 14 through which to output the signal outputted from the D/A converter 12.

The arrangement shown in FIG. 1 also includes a two-dimensional band-pass filter (BPF) 15 which is a spatial-frequency filter for extracting only a signal having a predetermined frequency band useful for detecting a motion vector, from the luminance signal outputted from the Y process circuit 8, the BPF filter 15 serving to eliminate the high and low spatial frequency components of an image signal which are unsuitable for detecting a motion vector, a motion-vector detecting circuit 16 for detecting a motion vector indicative of movements of an image in horizontal (H) and vertical (V) directions from the output signal of the BPF filter 15, a third memory 17 for temporarily storing the output signal of the BPF filter 15, the output signal of the third memory 17 being inputted to the motion-vector detecting circuit 16, and a memory-reading controlling circuit 18 for controlling the image reading position of each of the first and second memories 9 and 10 on the basis of the output of the motion-vector detecting circuit 16 so that shake of an image in the respective horizontal and vertical directions can be corrected. The image reading position of each of the first and second memory 9 and 10 is shifted in the direction of, and by the amount of a movement indicated by, the motion vector obtained in the motion-vector detecting circuit 16, whereby the movements, i.e., shake, of the image in the horizontal and vertical directions can be cancelled.

The chrominance and luminance signals C and Y, the image-shake of which has been corrected in the above-described manner, are respectively supplied from the first and second memories 9 and 10 to the D/A converters 11 and 12. The chrominance and luminance signals C and Y are respectively converted by the D/A converters 11 and 12 and outputted through the first and second signal output terminals 13 and 14.

FIG. 2 is a block diagram showing the arrangement of a video camera having an image-shake preventing device of the conventional, optical correction type. In FIG. 2, identical reference numerals are used to denote constituent parts identical to those shown in FIG. 1, and description thereof is omitted. Unlike the arrangement shown in FIG. 1, the memory-reading controlling circuit 18 is omitted from the arrangement shown in FIG. 2, and a variable angle prism (VAP) 19 is instead turnably disposed in front of the optical system 1 and a prism controlling circuit 20 is disposed for driving and controlling the variable angle prism 19. The variable angle prism 19 has a structure in which a liquid of high refractive index is charged into the sealed space between two parallel flat plates, and is arranged to be able to change the direction of its optical axis, i.e., its apex angle, by varying the angle made by the two parallel flat plates. The prism controlling circuit 20 includes a vertical-direction control part (V-direction VAP controlling part) 20a for driving and controlling the variable angle prism 19 to correct a movement of an image in the vertical direction thereof and a horizontal-direction control part (H-direction VAP controlling part) 20*b* for driving and controlling the variable angle prism 19 to correct a movement of the image in the horizontal direction thereof.

A motion-vector detection signal indicative of a motion vector detected by the motion-vector detecting circuit 16 is inputted to the prism controlling circuit 20, and the variable angle prism 19 is driven and controlled by the prism controlling circuit 20 so that shake of the image in the vertical and horizontal directions thereof can be corrected.

However, in an image-shake preventing device which relies on only a conventional electronic correcting system, as shown in FIG. 1, which electronically corrects shake in the vertical and horizontal directions, it is necessary to make an image reading area smaller than the picture size of an image stored in the memory and it is, therefore, necessary to perform processing, such as enlargement and interpolation, for restoring the picture size of a read image to the original picture size. This leads to image degradation which is particularly noticeable in the case of a shake correction in the vertical direction, in which the number of available pixels is small.

In an image-shake preventing device which relies on only the conventional optical correcting system, as shown in FIG. 2, which optically corrects shake in the vertical and horizontal directions, although no substantial image degradation occurs, a special optical system and a control circuit therefor are needed. For this reason, the image-shake preventing device of the conventional optical correcting type has a higher price and a greater power consumption than that of the conventional electronic correcting type.

Japanese Laid-Open Patent Application No. Sho 63-166370 and the like disclose a purely electronic image-shake correcting device which is arranged to store a video signal outputted from an image pickup element (CCD) in an image memory or the like, detect an image shake from information about the video signal to find the amount of displacement of the image, and shift an image reading address of the image memory according to the amount of displacement of the image, thereby correcting the image shake.

It has also been proposed to provide a large-picture (area) image pickup element type of image-shake preventing device which includes a large-picture image pickup element having a larger picture area than a normal image pickup element. This type of image-shake preventing device is arranged to detect a movement by means of an acceleration sensor or the like and control a reading start position of an image which is stored in a field memory, without using a memory and according to a detection signal provided by the acceleration sensor, thereby correcting an image shake.

There is another optical type of image-shake preventing device in addition to the above-described image-shake preventing device which includes the variable angle prism (VAP) and is arranged to detect a movement by means of the acceleration sensor and optically correct an image shake. For example, an inertial pendulum type of image-shake preventing device (U.S. Pat. Nos. 2,959,088 and 2,829,557 and the like) is known. In the inertial pendulum type of image-shake preventing device, an inertial pendulum type of shake preventing lens having a two-axes gimbal structure is disposed around a master lens, and an image shake is cancelled by this shake preventing lens, thereby correcting the image shake.

SUMMARY OF THE INVENTION

A first object of the present invention which has been made in light of the above-described problems is to realize an image-shake correcting device which includes in combination an electronic correcting system and an optical correcting system so that it is possible to fully utilize the advantages of both correcting systems.

A second object of the present invention is to provide an image-shake correcting device which is capable of correcting an image shake without causing a substantial degradation in image quality and which has a small power consumption compared to an arrangement for optically correcting image shakes in both horizontal and vertical directions.

To achieve the above objects, in accordance with one aspect of the present invention, there is provided an image-shake correcting device which includes motion-vector detecting means for detecting a motion vector of an image in the horizontal and vertical directions thereof, optical correcting means for optically correcting a movement of the image in the vertical direction thereof, and electronic correcting means for electronically correcting a movement of the image in the horizontal direction thereof.

A third object of the present invention is to provide an image-shake correcting device capable of executing optimum shake correction control which can realize good characteristics at all times, by selectively controlling an optical image-shake correcting device and an electronic image-shake correcting device.

A fourth object of the present invention is to provide an image-shake correcting device capable of realizing optimum shake correction characteristics according to the statue of various photographic characteristics.

To achieve the above objects, in accordance with another aspect of the present invention, there is provided an image-shake correcting device which includes an electronic image-shake correcting device and an optical image-shake correcting device and is arranged to selectively control both of them according to individual shake frequencies.

A fifth object of the present invention is to provide an image-shake correcting device which can be adapted to any photographic status by switching the characteristics of image-shake correcting means according to the focal length of an image pickup apparatus.

A sixth object of the present invention is to provide an image-shake correcting device which is capable of selectively varying the proportion of the operations of a plurality of shake correcting means according to the amount of shake or the amount of correction of shake.

A seventh object of the present invention is to provide a video camera with the aforesaid image-shake correcting device.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 17 is a view of a conversion table which is used in the image-shake preventing device according to the eighth embodiment and shows the allocation of the control gains of individual correcting means with respect to image deviation;

FIG. 18 is a view of a conversion table which is used in an image-shake preventing device according to a ninth embodiment and shows the allocation of the control gains of individual correcting means with respect to image deviation;

DETAILED DESCRIPTION OF THE PREFERRED EMBODIMENTS

Embodiments of an image-shake correcting device according to the present invention will be described below in detail with reference to the accompanying drawings.

(First Embodiment)

Figure 2:
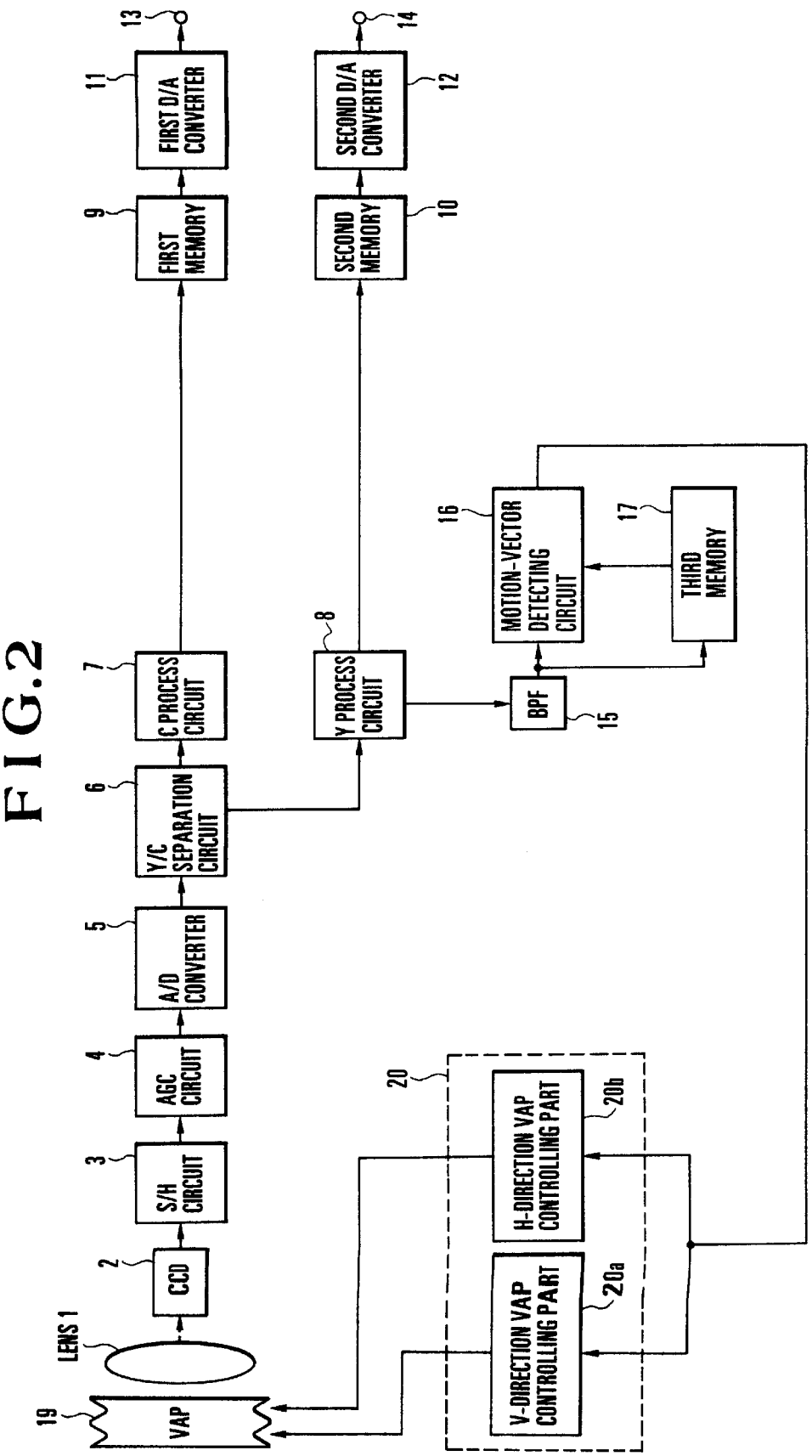
FIG. 2 is a block diagram showing the arrangement of an optical image-shake correcting device.
Figure 3:
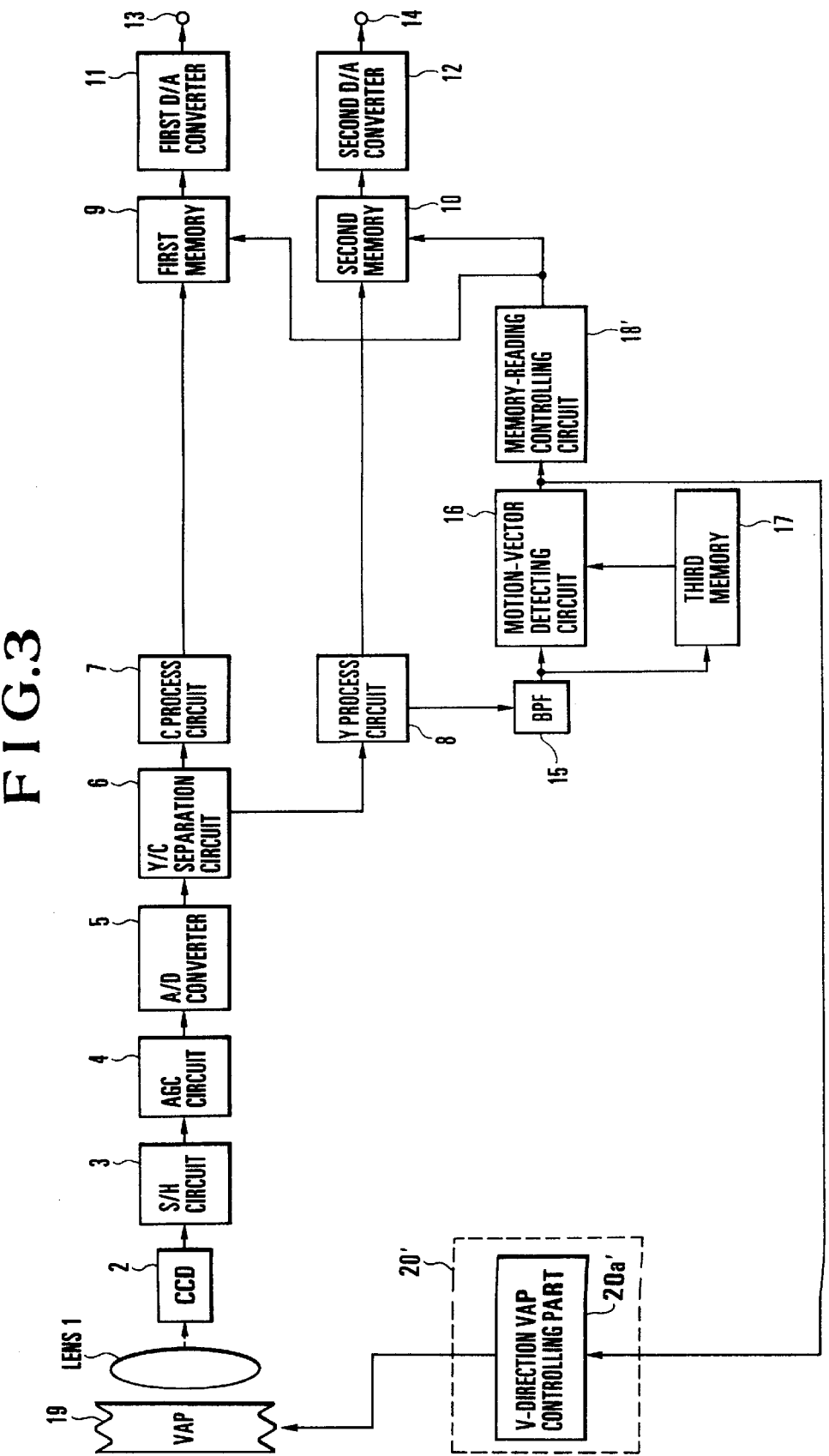
FIG. 3 is a block diagram showing a first embodiment of the present invention.

FIG. 3 is a block diagram showing a first embodiment of the image-shake correcting device according to the present invention. In FIG. 3, identical reference numerals are used to denote constituent parts identical to those shown in FIGS. 1 and 2, and description thereof is omitted.

Figure 1:
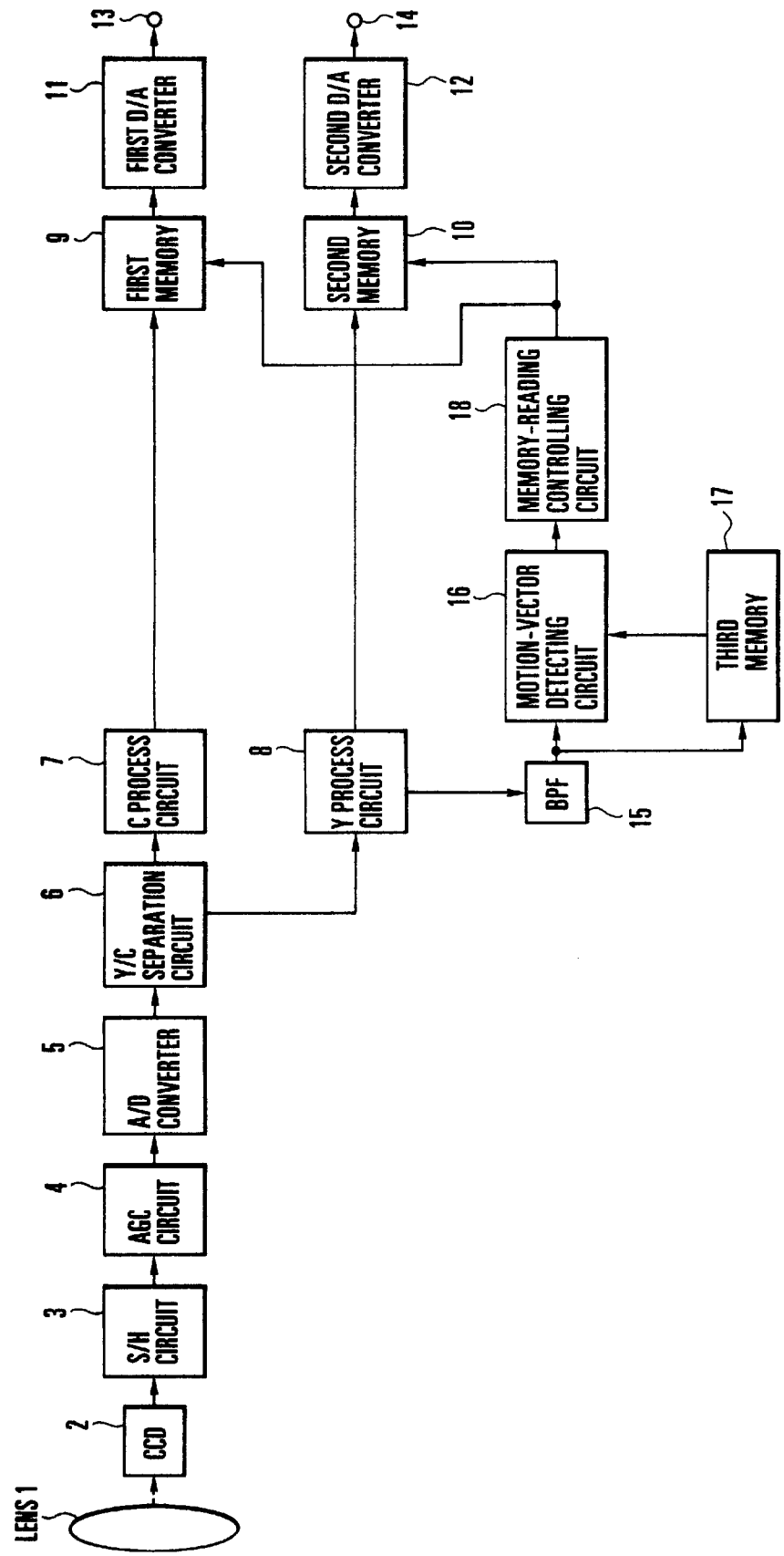
FIG. 1 is a block diagram showing the arrangement of an electronic image-shake correcting device.

The arrangement shown in FIG. 3 differs from either of those shown in FIGS. 1 and 2 in that a variable angle prism (VAP) 19 and a prism controlling circuit 20' for driving and controlling the variable angle prism 19 are added to the arrangement shown in FIG. 1. The prism controlling circuit 20' used in the first embodiment has only a vertical-direction control part (V-direction VAP controlling part) 20a' for driving and controlling the variable angle prism 19 to correct a movement of an image in the vertical direction thereof, and does not have a horizontal-direction control part (H-direction VAP controlling part) for driving and controlling the variable angle prism 19 to correct a movement of the image in the horizontal direction thereof. The variable angle prism 19 is driven and controlled by the prism controlling circuit 20', whereby only movement of the image in the vertical direction thereof can be optically corrected. Accordingly, the variable angle prism 19 and the prism controlling circuit 20' constitute optical shake correcting means for optically correcting shake of the image in the vertical direction thereof.

A memory-reading controlling circuit 18' used in the first embodiment is arranged to control the image reading positions of the respective first and second memories 9 and 10 so that only a movement of the image in the horizontal direction thereof can be corrected. Accordingly, the memory-reading controlling circuit 18' constitutes electronic shake correcting means for electrically correcting shake of the image in the horizontal direction thereof.

Specifically, the feature of the first embodiment is that movement of the image in the vertical direction thereof is optically corrected by driving and controlling the variable angle prism 19, while movement of the image in the horizontal direction thereof is electronically corrected by controlling the image reading positions of the respective first and second memories 9 and 10.

The construction and operation of the other portion of the first embodiment are substantially identical to the construction and operation described previously in connection with each of FIGS. 1 and 2, and description thereof is omitted.

If a shake of an image in the vertical direction thereof is subjected to electronic shake correction, the quality of the image will be degraded because the number of pixels of the image is smaller in the vertical direction than in the horizontal direction. According to the first embodiment, since shake of the image in the vertical direction thereof is corrected by the optical shake correcting means, it is possible to correct shake of the image in the vertical direction thereof without a degradation of image quality. In the case of a shake of an image in the horizontal direction thereof, which can be corrected without a remarkable degradation in image quality by electronic shake correction because a larger number of pixels are available, the electronic shake correcting means is selected, so that it is possible to reduce power consumption compared to optical shake correction and it is also possible to simplify a driving system.

As described above in detail, according to the first embodiment of the image-shake preventing device, since the electronic correcting means corrects only movement of an image in the horizontal direction thereof, it is possible to eliminate the disadvantage of the conventional electronic correcting means arranged to correct movement of an image in both vertical and horizontal directions thereof, i.e., it is possible to prevent occurrence of a degradation in image quality due to the correction of image shake in the vertical direction thereof. In addition, since the optical correcting means corrects only movement of an image in the vertical direction thereof, it is possible to provide an inexpensive arrangement compared to the conventional optical correcting means arranged to correct movement of an image in both vertical and horizontal directions thereof. In addition, it is possible to adopt a compact control circuit.

Second to eleventh embodiments of the present invention will be described below in that sequence. Unlike the first embodiment in which movement of an image in the vertical and horizontal directions thereof are separately handled by the respective optical and electronic correcting means, each of the second to eleventh embodiments is arranged to adaptively control the proportion of the operation of the optical correcting means to that of the electronic correcting means according to various factors such as image pickup conditions, the frequency of a shake, the amount of a shake and the amount of correction.

A so-called hybrid system provided with both optical correcting means and electronic correcting means has a number of problems which will be described below.

For example, in the case of a conventional hybrid correcting system in which an image-shake correcting system having a feedback loop, such as the optical correcting means, and an image-shake correcting system employing an image memory are simply combined with each other, there is the problem that if the shake frequency is high or photography or the like is performed on a wide-angle side on which the amplitude of an image shake is small, a degradation in high-frequency characteristic due to a delay of the feedback loop tends to stand out under the influence of the image-shake correcting system having the feedback loop. On the contrary if the shake frequency is low or photography or the like is performed on a telephoto side on which the amplitude of the image shake is large, an excessive correction beyond an optimum correction range tends to easily occur under the influence of the image-shake correcting system having a image memory.

The following embodiments have been made in light of the above-described problems, and their primary object is to provide an image-shake preventing device in which, although a plurality of correcting means are combined, it is possible to readily and securely effect flexible image-shake correction which can cope with various photographic statuses without causing degradation of a high-frequency characteristic, an excessive correction beyond an optimum correction range, or the like.

To achieve the above object, in accordance with the second embodiment, there is provided an image-shake preventing device which is arranged to detect a motion vector from an image signal and correct an image shake and which includes motion-vector detecting means for detecting motion vectors relative to temporally continuous images by performing a computation on a correlation between the temporally continuous images, shake-frequency computing means for computing the shake frequency of an image on the basis of the motion vectors detected by the motion-vector detecting means, first correcting means having a feedback loop and arranged to correct the image shake, second correcting means having a field memory and arranged to correct the image shake by using an image delayed by the field memory, and control means for varying the proportions of the amounts of shake correction to be respectively performed by the first and second correcting means, on the basis of the shake frequency of the image computed by the shake-frequency computing means.

In the above-described arrangement, on the basis of the shake frequency of the image computed by the shake-frequency computing means, the control means varies the proportion of the amount of shake correction to be performed by the first correcting means to the amount of shake correction to be performed by the second correcting means in an overall image-shake correction.

(Second Embodiment)

Figure 4:
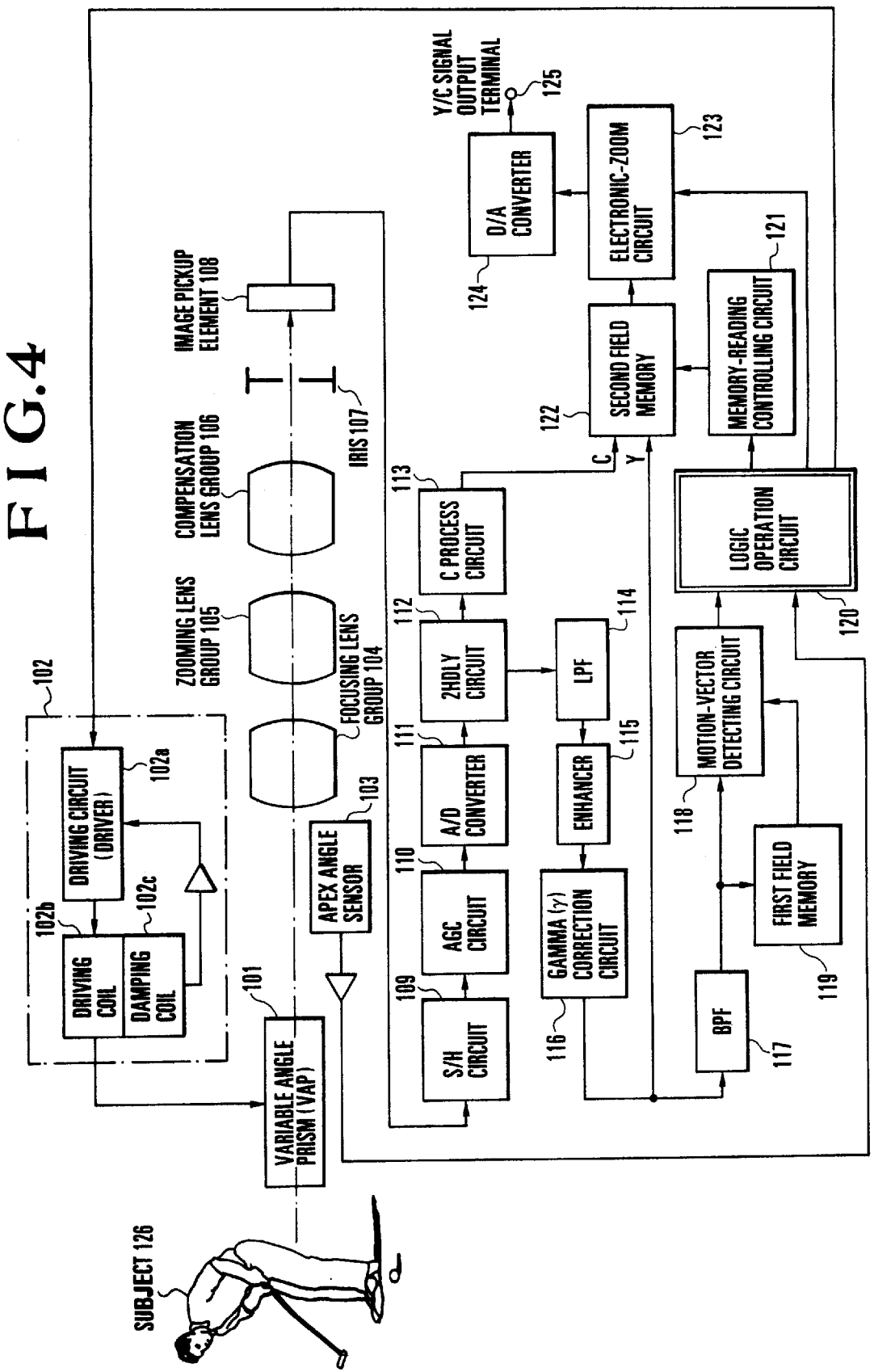
FIG. 4 is a block diagram showing the arrangement of an image pickup apparatus provided with an image-shake correcting device according to a second embodiment of the present invention.
Figure 5:
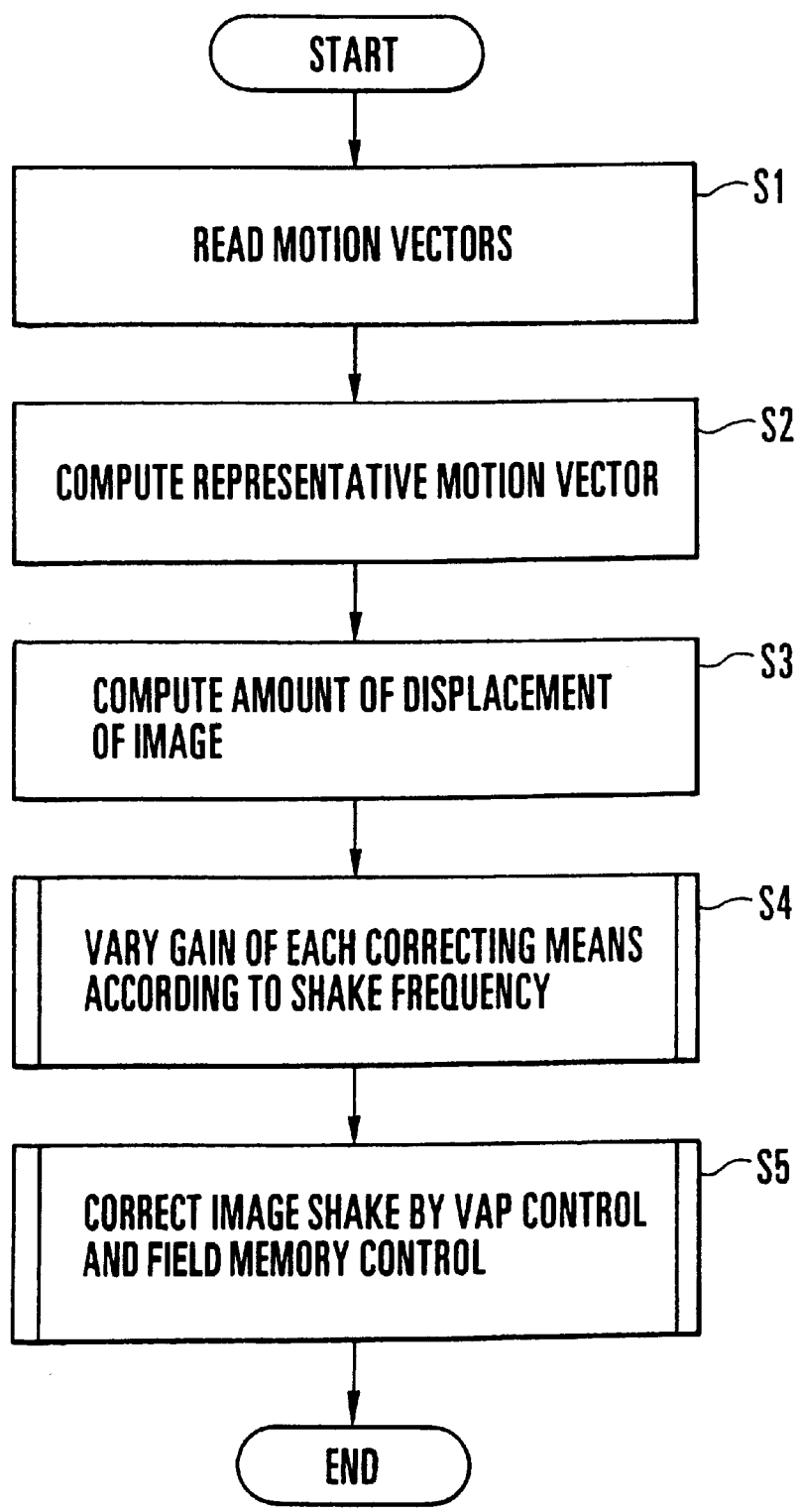
FIG. 5 is a flowchart showing the control operation of a logic operation circuit used in the image-shake correcting device according to the second embodiment shown in FIG. 4.
Figure 6:
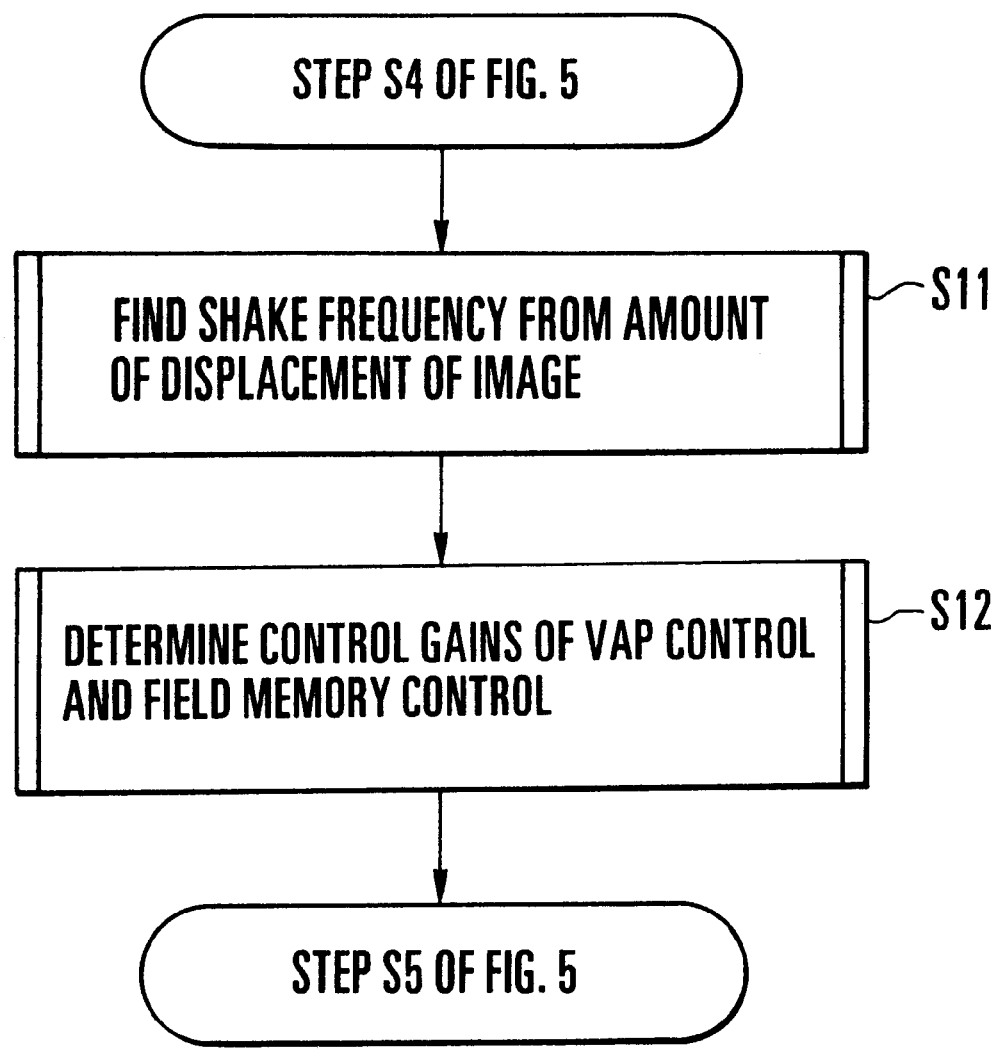
FIG. 6 is a flowchart showing the processing operation of the essential portion of the logic operation circuit used in the image-shake correcting device according to the second embodiment shown in FIG. 4.

The second embodiment of the present invention will be described below with reference to FIGS. 4 to 6. FIG. 4 is a block diagram showing the arrangement of a video camera which is an image pickup apparatus provided with the second embodiment of the image-shake preventing device according to the second embodiment of the present invention.

In the arrangement shown in FIG. 4, a variable angle prism (VAP) 101, which is turnably arranged, constitutes first correcting means which has a feedback loop and serves to correct an image shake. The VAP 101 is driven and controlled by VAP driving means 102. The VAP driving means 102 includes a VAP driving circuit (driver) 102*a*, a VAP driving coil 102*b* and a VAP damping coil 102*c*, and is controlled by a control signal outputted from a logic operation circuit 120 which will be described later. A VAP apex angle sensor 103 is provided for detecting the apex angle of the VAP 101, and the detection signal of the VAP apex angle sensor 103 is inputted to the logic operation circuit 120 which will be described later. The VAP driving means 102 is arranged to drive the VAP 101 in both vertical and horizontal directions thereof.

The arrangement shown in FIG. 4 also includes a focusing lens group 104 provided for the purpose of focusing, a zooming lens group 105 for varying the focal length, a compensation lens group 106, an iris 107 for adjusting the amount of light, an image pickup element 108 made up of, for example, a two-dimensional CCD and provided for converting a light signal inputted through the lens groups 104 to 106 and the iris 107 into an electrical signal and outputting the electrical signal, a sample-and-hold (S/H) circuit 109 for holding the electrical signal outputted from the image pickup element 108, and an automatic gain control (AGC) circuit 110 for automatically controlling the gain of the signal outputted from the S/H circuit 109.

The arrangement shown in FIG. 4 also includes an analog/digital (A/D) converter 111 for converting an analog signal outputted from the AGC circuit 110 into a digital signal, a delay (2HDLY) circuit 112 for receiving the output signal of the A/D converter 111 and delaying a color-difference line-sequential signal outputted from the image pickup element 108 by two horizontal scanning periods, a chrominance signal generating (C process) circuit 113 for receiving the output signal of the 2HDLY circuit 112 and generating a chrominance (C) signal, a low-pass filter (LPF) 114 for receiving the output signal of the 2HDLY circuit 112 and eliminating a chrominance signal contained in the luminance signal Y, and an enhancer 115 for receiving the output signal of the LPF 114 and enhancing a high-frequency thereof.

The arrangement shown in FIG. 4 also includes a gamma (γ) correction circuit 116 for receiving the output signal of the enhancer 115 and performing gamma correction thereof, a two-dimensional band-pass filter (BPF) 117 which is a spatial frequency filter for receiving the output signal of the gamma correction circuit 116 and eliminating a signal having a predetermined frequency band from the received signal, and a motion-vector detecting circuit 118 for receiving both the output signal of the BPF 117 provided for extracting only the frequency band required for shake detection and the output signal of a first field memory 119 which will be described later, and detecting a motion vector of an image on the basis of a variation between two pictures which temporally differ from each other. The motion-vector detecting circuit 118 is a circuit which is based on a matching computation, and, in the second embodiment, it is preferable that the motion-vector detecting circuit 118 adopt a detection method which can execute real-time processing. The first field memory 119 is arranged to receive the output signal of the BPF 117. The first field memory 119 serves as a delay circuit for delaying the luminance signal Y by a predetermined time (in the second embodiment, a one-field period), and is arranged to store the luminance signal Y contained in a field which immediately precedes the current field, thereby enabling a matching computation on the previous and current fields. By this matching computation, it is possible to obtain the direction and the amount of movement of the image.

The logic operation circuit 120 controls the entire image pickup apparatus by performing predetermined kinds of signal processing, and is formed by a microcomputer. The logic operation circuit 120 receives the output signals of the VAP apex angle sensor 103 and the motion-vector detecting circuit 118 and controls the VAP driving circuit 102a and a memory-reading controlling circuit 121 on the basis of the output signals, thereby causing the VAP driving circuit 102a and the memory-reading controlling circuit 121 to perform optical shake correction and electronic shake correction, respectively.

The logic operation circuit 120 computes the amount of correction required for optically correcting the direction and the amount of movement of the image due to shake, on the basis of motion vector information outputted from the motion-vector detecting circuit 118. Then, the logic operation circuit 120 supplies the computed amount of correction to the VAP driving means 102 and drives the VAP driving coil 102b via the VAP driving circuit 102a, thereby causing the VAP 101 to operate. In this manner, it is possible to optically correct movement of the image due to shake.

A second field memory 122 receives and stores the chrominance signal C outputted from a C process circuit 113 and the luminance signal Y outputted from the gamma correction circuit 116. The memory-reading controlling circuit 121 controls a position and an area in the second field memory 122 from which to read out image information, on the basis of movement correction information outputted from the logic operation circuit 120. The second field memory 122 and the memory-reading controlling circuit 121 constitute second correcting means.

Specifically, the logic operation circuit 120 computes, on the basis of the motion vector information outputted from the motion-vector detecting circuit 118, the direction and the amount in which the image is to be shifted to correct for movement of the image on the second field memory 122, and the memory-reading controlling circuit 121 controls a position and an amount in the second field memory 122 from which to read out the image information, on the basis of the direction and the amount in which the image is to be shifted, thereby cancelling the movement of the image.

An electronic-zoom circuit 123 receives the output signals of the second field memory 122 and the logic operation circuit 120 and converts the image into an image of desired size. Specifically, since a movement of an image is corrected by shifting an area on the second field memory 122 from which to read out the image, the picture size of the read-out image becomes smaller than that of the image stored in the second field memory 122. To cope with this problem, the electronic-zoom circuit 123 performs the processing of enlarging the read-out image up to the original picture size.

Accordingly, if the magnitude of movement of an image is small, the amount in which an image reading area on the second field memory 122 is to be shifted may be small, so that the image reading area can be made large. Therefore, the ratio at which the image is enlarged may be small. However, if the magnitude of movement of the image is large, the image reading area needs to be made small because the amount of shifting of the image reading area on the second field memory 122 needs to be large. Therefore, the ratio at which the image is enlarged is made large. To execute such control, the logic operation circuit 120 is arranged to compute the amount of shifting of the image according to a motion vector and transmits an image enlargement ratio according to the computed amount of shifting to the electronic-zoom circuit 123.

A digital/analog (D/A) converter 124 is provided for converting a digital signal outputted from the electronic-zoom circuit 123 to an analog signal. The image signal made up of the corrected luminance and chrominance signals Y and C, which is outputted from the electronic-zoom circuit 123, is outputted through a signal output terminal 125.

The operation of the image pickup apparatus having the above-described arrangement will be described below.

An image of a subject 126 sequentially passes through the VAP 101, the lens groups 104 to 106 and the iris 107 and is formed on an image pickup surface of the image pickup element 108. The formed image of the subject 126 is photoelectrically converted by the image pickup element 108. The S/H circuit 109 holds the output signal of the image pickup element 108, and the AGC circuit 110 executes automatic gain control. The A/D converter 111 performs A/D conversion of the output signal of the AGC circuit 110. The 2HDLY circuit 112 separates the color-difference line-sequential signal outputted from the image pickup element 108 into a 1H delayed signal and a 2H delayed signal, and sends the respective 1H and 2H delayed signals to a luminance signal processing part (which includes the LPF 114 and so on) and a chrominance signal processing part (which includes the C process circuit 113 and so on). The 2H delayed signal sent to the chrominance signal processing part (which includes the C process circuit 113 and so on) is inputted to the C process circuit 113, and the C process circuit 113 generates the chrominance signal C and writes the chrominance signal C into the second field memory 122.

In the meantime, the 1H delayed signal sent to the luminance signal processing part (which includes the LPF 114 and so on) is inputted to the LPF 114, and the LPF 114 eliminates a carrier component from the color-difference line-sequential signal to perform separation of the luminance signal Y. The enhancer 115 performs the processing of enhancing the high-frequency component of the luminance signal Y, such as the edge of the image of the subject 126, for the purpose of improving image quality. Normally, in such processing, a quadratic differential of the video signal (luminance signal Y) is added to the original luminance signal Y. Then, the gamma correction circuit 116 executes the processing of preventing saturation of the high-light portion of the luminance signal Y and expanding the dynamic range thereof. The BPF 117 extracts a spatial frequency component which is useful for detecting a motion vector.

Since the high- and low-frequency components of an image signal are generally unsuitable for detecting a motion vector, they are eliminated by the BPF 117. In the second embodiment, only a sign bit is outputted from the BPF 117. This means that the luminance signal Y is converted into a two-level signal by using a DC level as a threshold. Accordingly, the luminance signal Y which has passed through the BPF 117 is a two-level signal represented by one bit.

The motion-vector detecting circuit 118 detects a motion vector of the image on the basis of the signals inputted from the BPF 117 and the first field memory 119, and inputs the detected motion vector signal to the logic operation circuit 120. Also, an apex-angle signal indicative of the apex angle of the VAP 101, which is detected by the VAP apex angle sensor 103, is inputted to the logic operation circuit 120. The logic operation circuit 120 calculates a deviation from a reference position of the image at that time instant in accordance with the flowchart shown in FIG. 5 which will be described later, on the basis of the motion vector signal (the horizontal and vertical components of a motion vector at a predetermined position in the picture) and the apex-angle signal. Then, the VAP 101 is subjected to feedback loop control on the basis of the deviation, and the VAP 101 is driven and controlled in a predetermined state by the VAP driving means 102 to bend the optical axis, thereby correcting image shake.

Then, to correct image shake of high frequency and small amplitude which is not completely corrected only by driving and controlling the VAP 101 (VAP control) in the above-described manner, the following control is performed. Specifically, the memory-reading controlling circuit 121 controls the image reading position of the second field memory 122 on the basis of a control signal outputted from the logic operation circuit 120 (field memory control), thereby correcting image shake. The image outputted from the second field memory 122 is converted into an image of desired size by the electronic-zoom circuit 123. In this manner, the image whose image shake is finally corrected is obtained. The corrected image signal is D/A converted by the D/A converter 124, and the analog signal is outputted through the signal output terminal 125.

The operation of the logic operation circuit 120 provided in the image-shake preventing device according to the second embodiment will be described below with reference to FIGS. 4 and 5. FIG. 5 is a flowchart showing the operation of the logic operation circuit 120. In Step S1, the logic operation circuit 120 reads the output signal of the motion-vector detecting circuit 118 (the horizontal and vertical components of a motion vector at a predetermined position in a picture) on a field-by-field basis. Then, the process proceeds to Step S2, in which the logic operation circuit 120 detects, at a plurality of positions per picture, a plurality of motion vectors from a movement of an image in a plurality of fields, and performs predetermined processing, such as an averaging or weighting computation, on the plurality of motion vectors, thereby computing one representative motion vector. The predetermined processing includes the processing of evaluating the reliability of each of the motion vectors, the processing of determining a target area to be controlled, and the like.

Then, the process proceeds to Step S3, in which the logic operation circuit 120 integrates the representative motion vector to find a deviation from a reference position in the picture (the amount of displacement of the image), thereby producing an image-shake correction signal. Then, the process proceeds to Step S4, in which the logic operation circuit 120 finds a shake frequency from the deviation of the image obtained in Step S3 and sets the control gain of each of the first and second correcting means to an optimum state on the basis of the shake frequency. Then, the process proceeds to Step S5, in which image-shake correction by the control of the VAP 101 (VAP control) or image-shake correction by the control of the second field memory 122 is executed on the basis of the amount of image-shake correction which is the deviation of the image obtained in Step S3 and the control gain set in Step S4. After that, the logic operation circuit 120 brings the process to an end.

Figure 7:
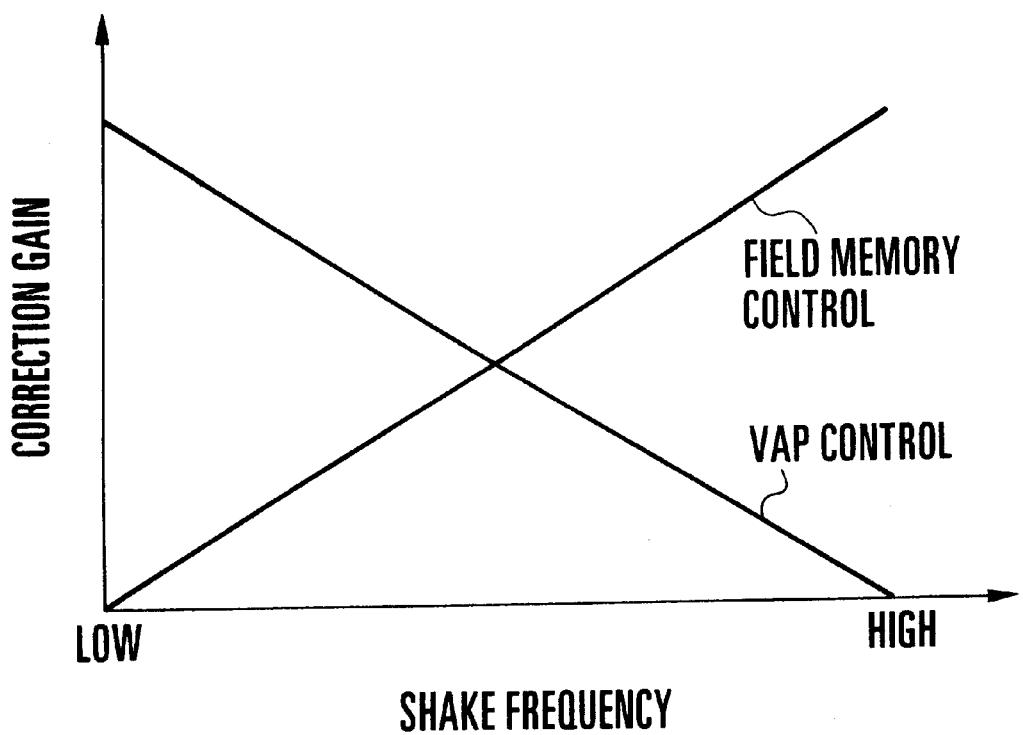
FIG. 7 is a view of a conversion table which is used in an image-shake preventing device according to the second embodiment shown in FIG. 4 and shows the allocation of the control gains of individual correcting means with respect to a shake frequency.

The processing of Step S4, which constitutes part of the gist of the present invention, will be described in more detail with reference to FIG. 6. FIG. 6 is a flowchart showing the detail of the processing routine of Step S4 of FIG. 5. In Step S11 of FIG. 6, the amount of displacement of the image obtained in Step S3 of FIG. 5 is subjected to a frequency analysis according to the capability of the present control system, such as the operation of counting the frequency of cross points relative to a predetermined reference value, thereby providing the shake frequency of the image. In Step S12, the respective control gains of the VAP control and the field memory control are determined according to the shake frequency of the image obtained in Step S11, on the basis of a conversion table of FIG. 7 which shows the allocation of the control gains with respect to shake frequency. In FIG. 7, the vertical axis and the horizontal axis represent correction (control) gain and the shake frequency, respectively. As is apparent from FIG. 7, the conversion table is set so that the proportion of the field memory control, i.e., the electronic shake correction to be performed by the second correcting means, in an overall image-shake correction becomes larger in a higher-frequency area, whereas, in a lower-frequency area, the proportion of the VAP control, i.e., the optical shake correction to be performed by the first correcting means, in the overall image-shake correction becomes larger.

In general, a low-frequency image shake tends to become large in amplitude, while a high-frequency image shake tends to become small in amplitude. Accordingly, it is desirable that an image shake of smaller amplitude be corrected in a higher-frequency area, while an image shake of larger amplitude be corrected in a lower-frequency area.

According to the second embodiment, in the image-shake preventing device in which the optical, first correcting means utilizing the VAP control and the electronic, second correcting means utilizing the field memory control are combined, the shake frequency of an image is calculated by a method which can be executed by the present control system, and the respective control gains of the VAP control and the field memory control are made to vary so that the proportion of the optical shake correction to be performed by the VAP control in an overall image-shake correction, which VAP control is capable of correcting an image shake of large amplitude, can be made larger in a lower-frequency area, while the proportion of the electronic shake correction to be performed by the field memory control in the overall image-shake correction can be made larger in a higher-frequency area, which field memory control realizes a good correction characteristic capable of correcting an image shake of small amplitude. Accordingly, it is possible to perform image-shake correction which utilizes as fully as possible the respective advantages of the first and second correcting means.

(Third Embodiment)

The third embodiment of the present invention will be described below with reference to FIG. 8.

Figure 8:
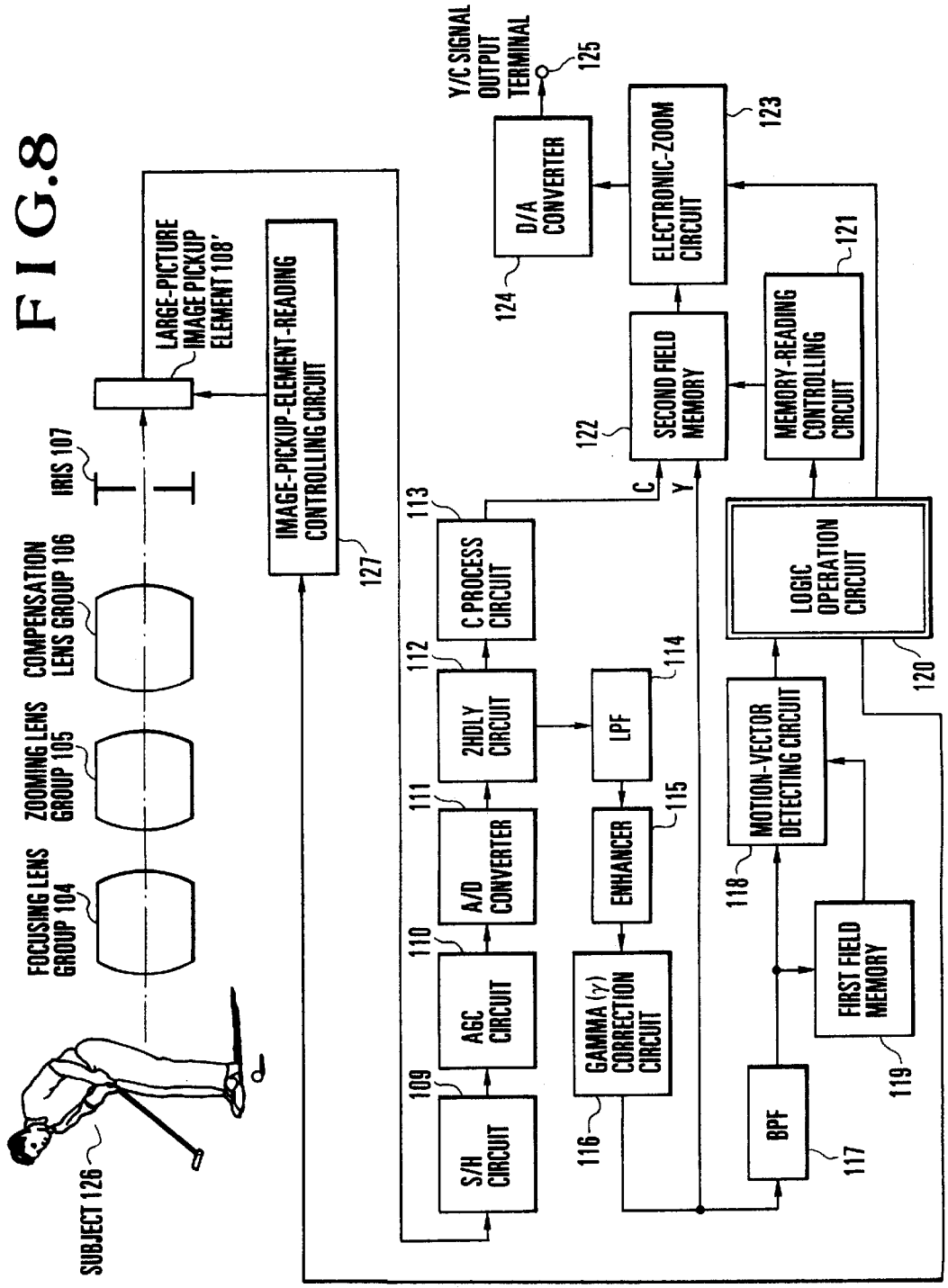
FIG. 8 is a block diagram showing the arrangement of a video camera which is an image pickup apparatus provided with an image-shake preventing device according to a third embodiment of the present invention.

FIG. 8 is a block diagram showing the arrangement of a video camera provided with an image-shake correcting device according to the third embodiment of the present invention. In FIG. 8, identical reference numerals are used to denote constituent parts identical to those used in the second embodiment described above with reference to FIG. 4. The arrangement shown in FIG. 8 differs from that shown in FIG. 4 in that the VAP 101, the VAP driving means 102, the VAP apex angle sensor 103 and the image pickup element 108 are omitted from the arrangement shown in FIG. 4 and, instead, a large-picture image pickup element 108' having a larger area than a normal image pickup element and an image-pickup-element-reading controlling circuit 127 are provided. The large-picture image pickup element 108' and the image-pickup-element-reading controlling circuit 127 constitute the first correcting means which has a feedback loop and serves to correct image shake. The image-pickup-element-reading controlling circuit 127 varies the reading address of the large-picture image pickup element 108' to cut out an image from an arbitrary area of the large-picture image pickup element 108', thereby effecting image-shake correction.

The other arrangement, operation, effects and advantages of the third embodiment are substantially identical to those of the second embodiment described previously, and description thereof is omitted.

(Fourth Embodiment)

Figure 9:
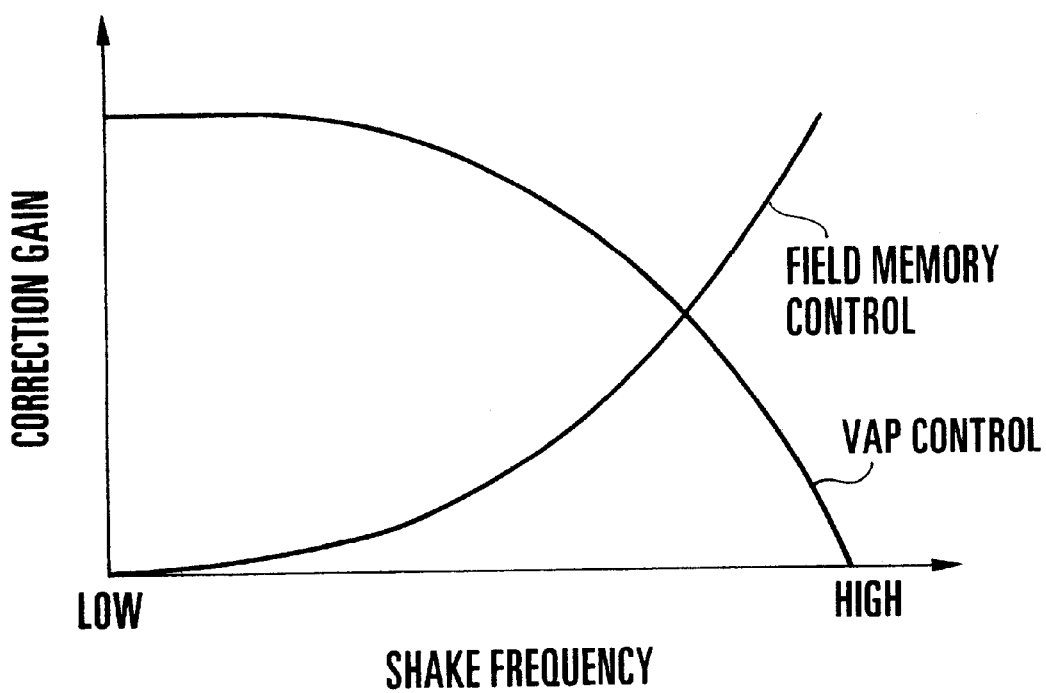
FIG. 9 is a view of a conversion table which is used in an image-shake preventing device according to a fourth embodiment and shows the allocation of the control gains of individual correcting means with respect to a shake frequency.

The fourth embodiment of the present invention will be described below with reference to FIG. 9. FIG. 9 is a view of a conversion table which shows the allocation of the control gains with respect to the shake frequency in an image-shake preventing device according to the fourth embodiment of the present invention. In the fourth embodiment, the relation between the shake frequency and the allocation of the control gains is made to vary not linearly as in the case of the second embodiment but in a manner expressed by an exponential function.

The other arrangement, operation, effects and advantages of the fourth embodiment are substantially identical to those of the second embodiment described previously, and description thereof is omitted.

(Fifth Embodiment)

Figure 10:
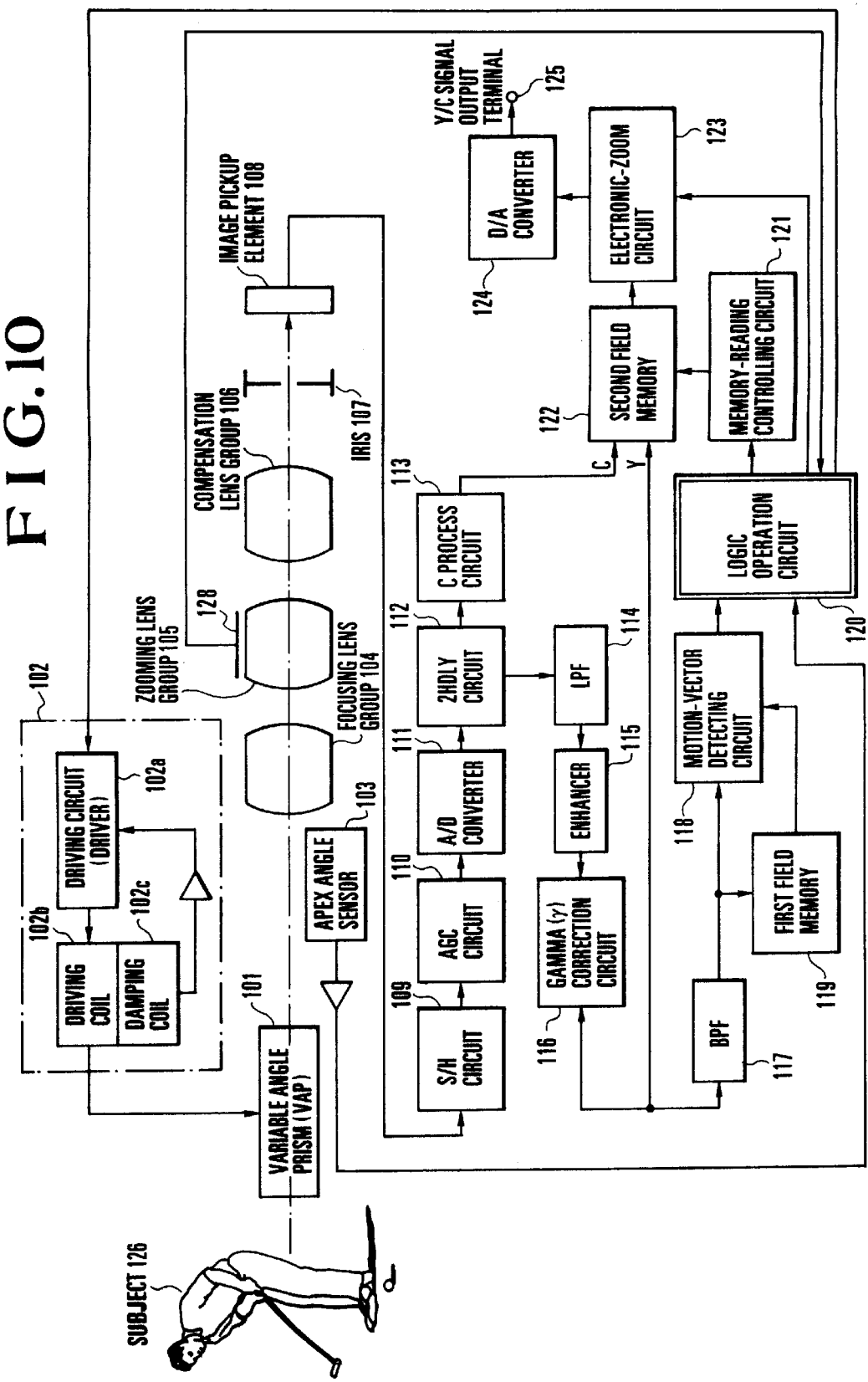
FIG. 10 is a block diagram showing the arrangement of a video camera which is an image pickup apparatus provided with an image-shake preventing device according to a fifth embodiment of the present invention.

The fifth embodiment of the present invention will be described below with reference to FIGS. 10 through 13. According to the fifth embodiment, there is provided an image-shake preventing device which is arranged to detect a motion vector from an image signal and correct image shake in real time. The image-shake preventing device includes first correcting means having a feedback loop and arranged to correct image shake, second correcting means having a field memory and arranged to correct image shake by using an image delayed by the field memory, focal-length reading means for reading a focal length of an optical system, and control means for varying the proportions of individual image-shake corrections to be performed by the first and second correcting means in an overall image-shake correction, on the basis of information indicative of the focal length read by the focal-length reading means. FIG. 10 is a block diagram showing the arrangement of a video camera provided with image-shake correcting device according to the fifth embodiment of the present invention. In FIG. 10, identical reference numerals are used to denote constituent parts identical to those used in the second embodiment described above with reference to FIG. 4. The arrangement shown in FIG. 10 differs from that shown in FIG. 4 in that a position encoder 128 for detecting the position of the zooming lens group 105 is added to the arrangement shown in FIG. 4. A position signal about the zooming lens group 105, which is detected by the position encoder 128, is inputted to the logic operation circuit 120. Incidentally, the construction and operation of the other portion of the fifth embodiment shown in FIG. 10 are substantially identical to the construction and operation of the second embodiment described previously.

Figure 11:
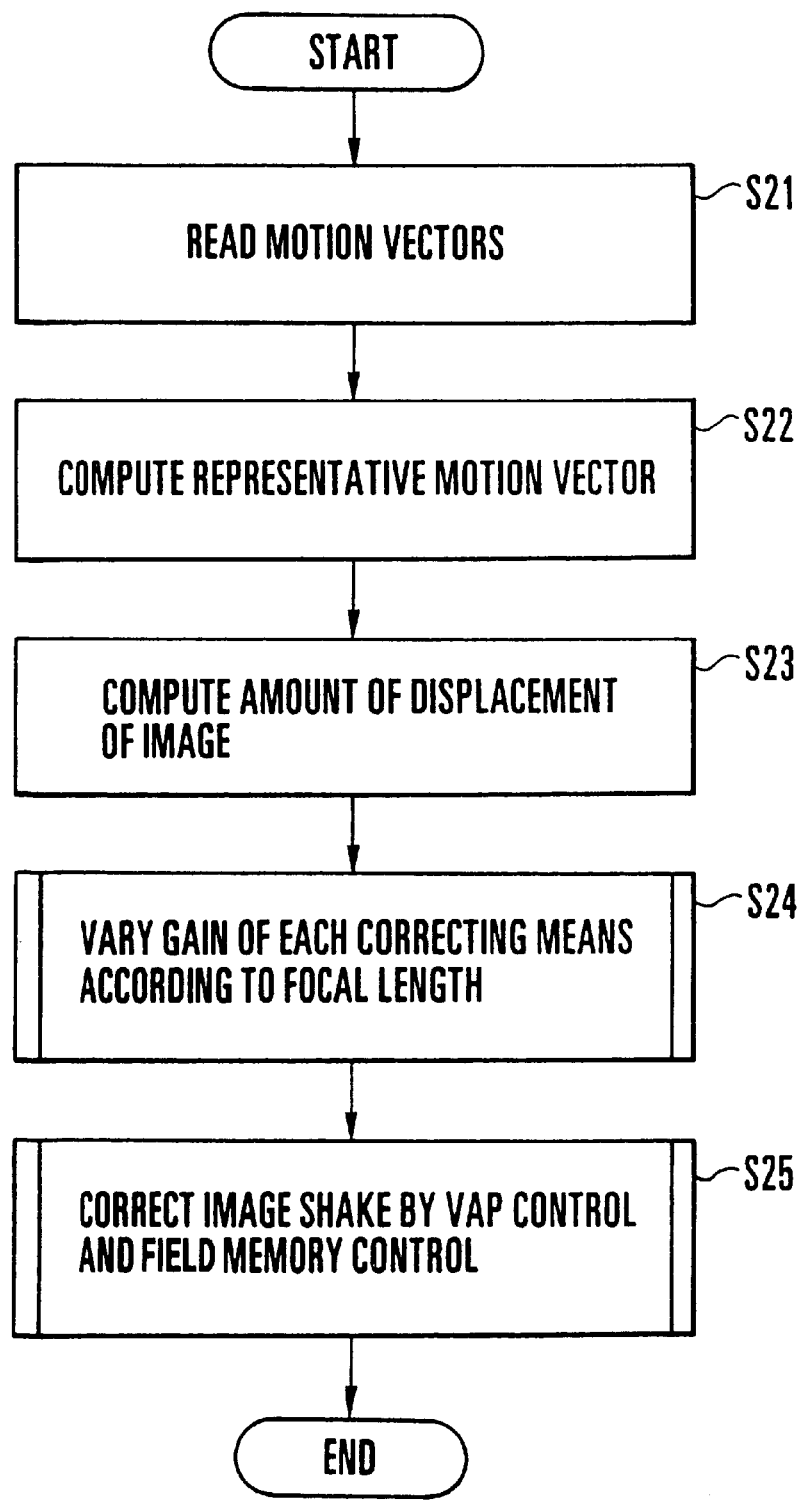
FIG. 11 is a flowchart showing the control operation of the essential portion of a logic operation circuit used in the image-shake preventing device according to the fifth embodiment of the present invention.

The operation of the logic operation circuit 120 provided in the image-shake preventing device according to the fifth embodiment will be described below with reference to FIGS. 10 and 11. FIG. 11 is a flowchart showing the operation of the logic operation circuit 120. In Step S21, the logic operation circuit 120 reads the output signal of the motion-vector detecting circuit 118 (the horizontal and vertical components of a motion vector at a predetermined position in a picture) on a field-by-field basis. Then, the process proceeds to Step S22, in which the logic operation circuit 120 performs predetermined processing on the read plurality of motion vectors at positions in a plurality of fields, thereby computing one representative motion vector. The predetermined process includes the processing of evaluating the reliability of each of the motion vectors, the process of determining a target area to be controlled, and the like.

Then, the process proceeds to Step S23, in which the logic operation circuit 120 integrates the representative motion vector to find a deviation from a reference position in the picture (the amount of displacement of the image), thereby producing an image-shake correction signal. Then, the process proceeds to Step S24, in which the logic operation circuit 120 sets the control gain of each of the first and second correcting means to an optimum state on the basis of the position signal about the zooming lens group 105 outputted from the position encoder 128, i.e., the focal-length signal about the optical system. Then, the process proceeds to Step S25, in which image-shake correction by the control of the VAP 101 (VAP control) or image-shake correction by the field memory control is executed on the basis of the amount of image-shake correction which is the deviation of the image obtained in Step S23 and the control gain set in Step S24. After that, the logic operation circuit 120 brings the process to an end.

Figure 12:
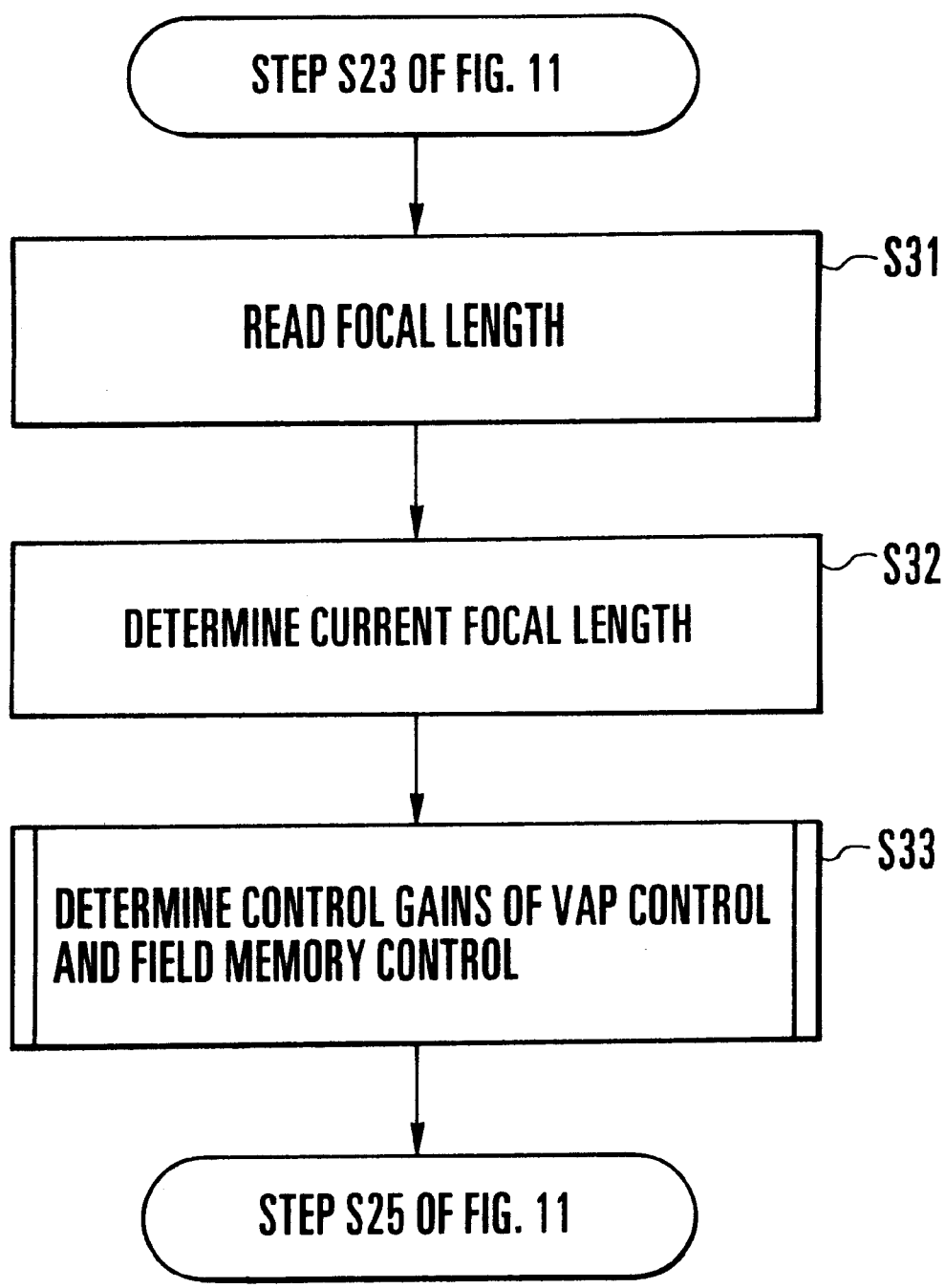
FIG. 12 is a flowchart showing the detail of the control operation of the essential portion of the logic operation circuit used in the image-shake preventing device according to the fifth embodiment of the present invention.
Figure 13:
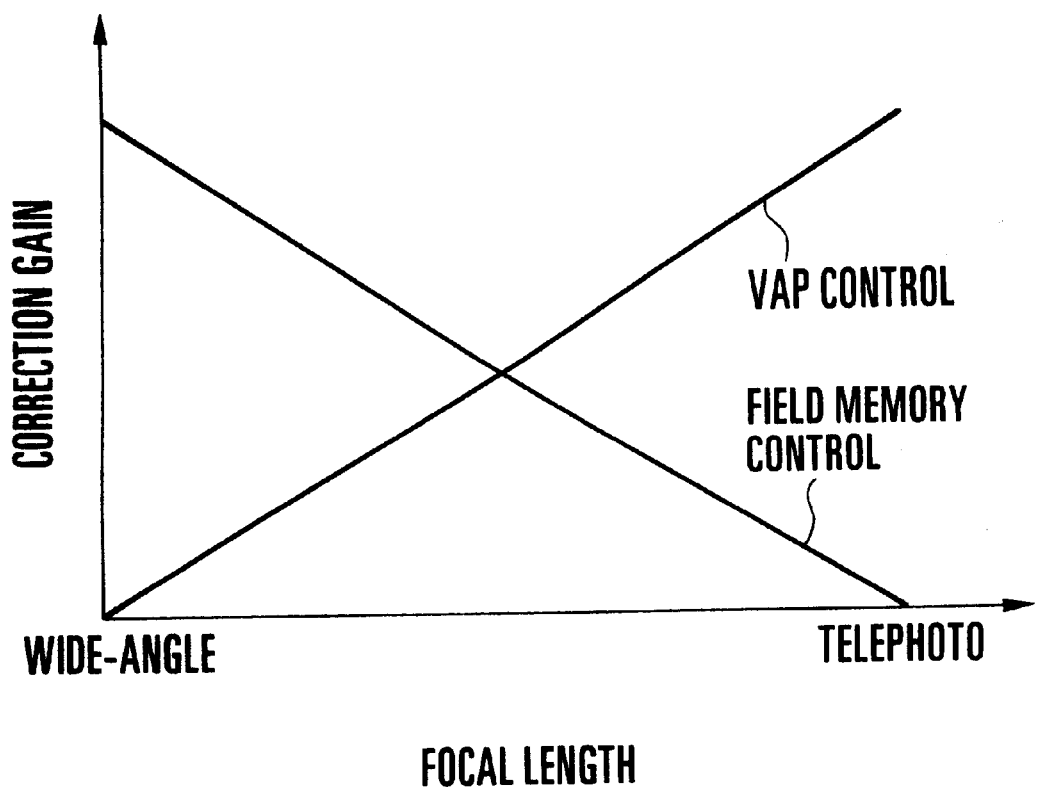
FIG. 13 is a view of a conversion table which is used in the image-shake preventing device according to the fifth embodiment shown in FIG. 10 and shows the allocation of the control gains of individual correcting means with respect to a shake frequency.

The processing of Step S24, which constitutes part of the gist of the present invention, will be described in more detail with reference to FIG. 12. FIG. 12 is a flowchart showing the details of the processing routine of Step S24 of FIG. 11. In Step S31 of FIG. 12, the focal-length signal outputted from the position encoder 128 is inputted to the logic operation circuit 120, and in Step S32 the actual focal length of the optical system is determined on the basis of the focal-length signal obtained in Step S31. Then, the process proceeds to Step S33, in which the respective control gains of the VAP control and the field memory control are determined according to the focal length determined in Step S32, on the basis of a conversion table of FIG. 13 which shows the allocation of the control gains with respect to the focal length. In FIG.

13, the vertical axis and the horizontal axis represent correction (control) gain and focal length, respectively. As is apparent from FIG. 13, the conversion table is set so that the proportion of the field memory control, i.e., the electronic shake correction to be performed by the second correcting means, in an overall image-shake correction becomes larger on a wider-angle side, whereas, on a more telephoto side, the proportion of the VAP control, i.e., the optical shake correction to be performed by the first correcting means, in the overall image-shake correction becomes larger.

In general, as the focal length is closer to its telephoto end, an image shake tends to increase. Accordingly, it is desirable that an image shake of smaller amplitude be corrected on the wider-angle side, while an image shake of larger amplitude be corrected on the more telephoto side.

According to the fifth embodiment, in the image-shake preventing device in which the optical, first correcting means utilizing the VAP control and the electronic, second correcting means utilizing the field memory control are combined, the focal length of the optical system is monitored to appropriately vary the respective control gains of the VAP control and the field memory control so that the proportion of the optical shake correction to be performed by the VAP control in an overall image-shake correction, which VAP control is capable of correcting an image shake of large amplitude, can be made larger on a more telephoto side, while the proportion of the electronic shake correction to be performed by the field memory control in the overall image-shake correction can be made larger on a wider-angle side, which field memory control realizes a good correction characteristic capable of correcting an image shake of small amplitude. Accordingly, it is possible to perform image-shake correction which utilizes as fully as possible the respective advantages of the first and second correcting means.

(Sixth Embodiment)

The sixth embodiment of the present invention will be described below with reference to FIG. 14.

Figure 14:
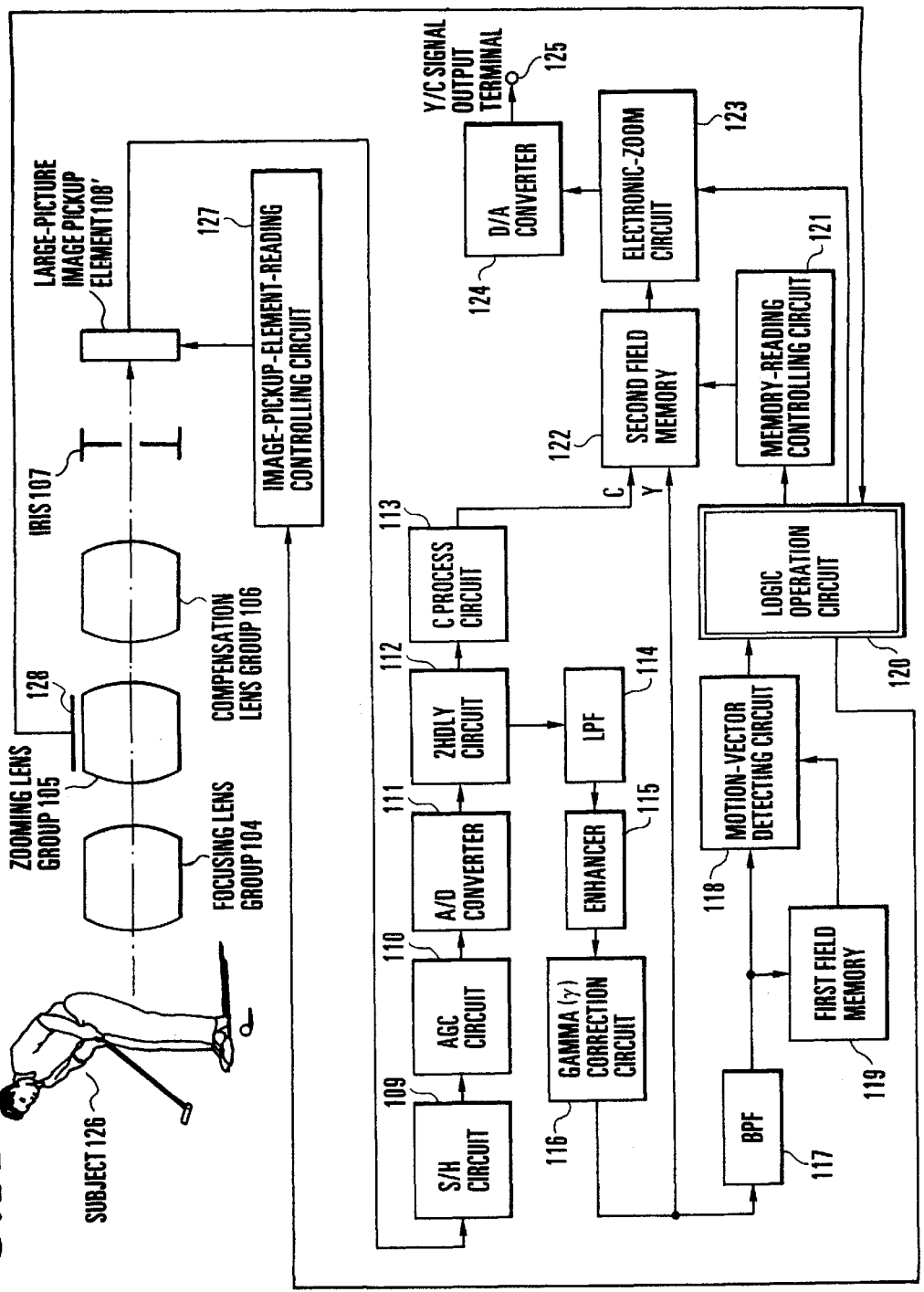
FIG. 14 is a block diagram showing the arrangement of a video camera which is an image pickup apparatus provided with an image-shake preventing device according to a sixth embodiment of the present invention.

FIG. 14 is a block diagram showing the arrangement of a video camera provided with an image-shake correcting device according to the sixth embodiment of the present invention. In FIG. 14, identical reference numerals are used to denote constituent parts identical to those used in the fifth embodiment described above with reference to FIG. 10. The arrangement shown in FIG. 14 differs from that shown in FIG. 10 in that the VAP 101, the VAP driving means 102, the VAP apex angle sensor 103 and the image pickup element 108 the arrangement omitted from the arrangement shown in FIG. 10 and are instead is provided with a large-picture image pickup element 108' having a larger area than a normal image pickup element, an image-pickup-element-reading controlling circuit 127 and a position encoder 128 for detecting the position of the zooming lens group 105. A position signal about the zooming lens group 105, which is detected by the position encoder 128, is inputted to the logic operation circuit 120. The large-picture image pickup element 108' and the image-pickup-element-reading controlling circuit 127 constitute the first correcting means which has a feedback loop and serves to correct an image shake. The image-pickup-element-reading controlling circuit 127 varies the reading address of the large-picture image pickup element 108' to cut out an image from an arbitrary area of the large-picture image pickup element 108', thereby effecting image-shake correction.

The other arrangement, operation, effects and advantages of the sixth embodiment are substantially identical to those of the fifth embodiment described previously, and description thereof is omitted.

(Seventh Embodiment)

Figure 15:
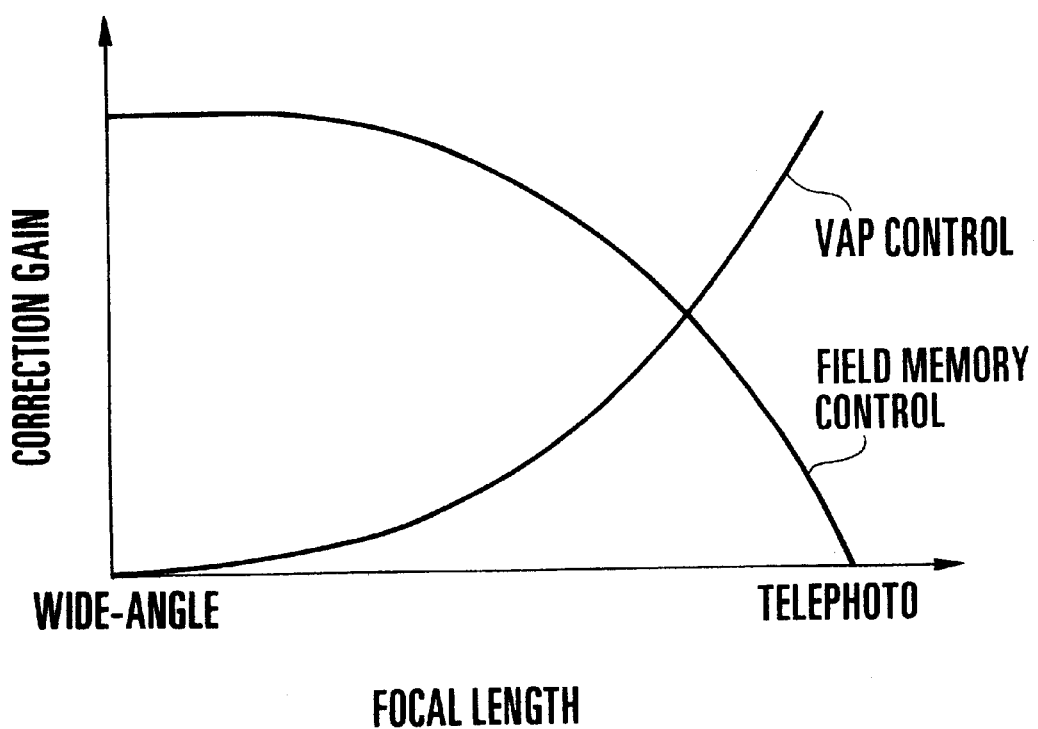
FIG. 15 is a view of a conversion table which is used in an image-shake preventing device according to a seventh embodiment and shows the allocation of the control gains of individual correcting means with respect to focal length.

The seventh embodiment of the present invention will be described below with reference to FIG. 15. FIG. 15 is a view of a conversion table which shows the allocation of the control gains with respect to the focal length in an image-shake preventing device according to the seventh embodiment of the present invention. In the seventh embodiment, the relation between the focal length and the allocation of the control gains is made to vary not linearly as in the case of the fifth embodiment but in a manner expressed by an exponential function.

The other arrangement, operation, effects and advantages of the seventh embodiment are substantially identical to those of the fifth embodiment described previously, and description thereof is omitted.

(Eighth Embodiment)

Figure 16:
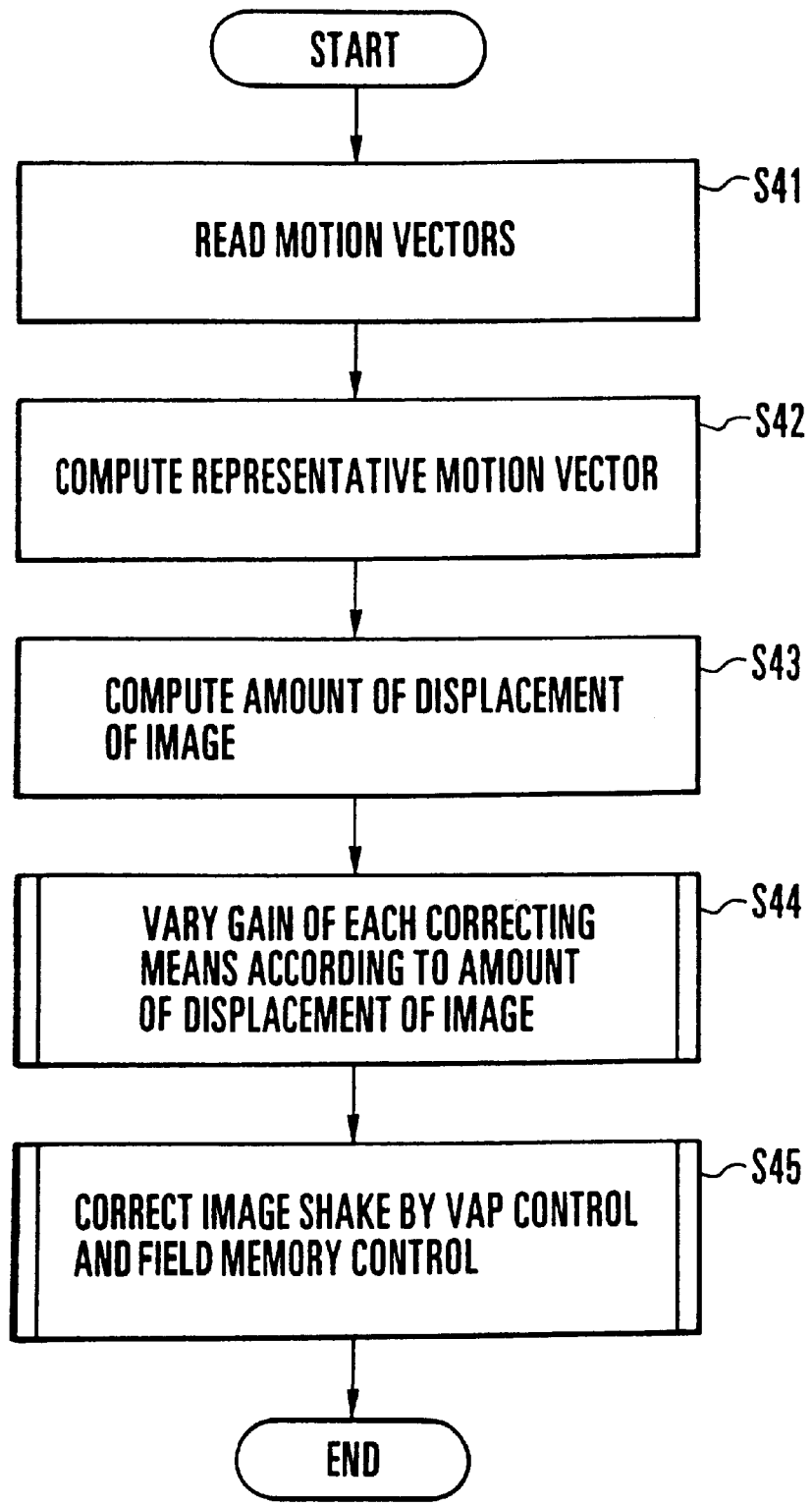
FIG. 16 is a flowchart showing the control operation of a logic operation circuit used in an image-shake preventing device according to an eighth embodiment of the present invention.

The eighth embodiment of the present invention will be described below with reference to FIGS. 16 and 17. According to the eighth embodiment, there is provided an image-shake preventing device which is arranged to detect a motion vector from an image signal and correct image shake in real time. The image-shake preventing device includes motion-vector detecting means for detecting motion vectors relative to temporally continuous images by performing a computation on a correlation between the temporally continuous images, absolute-deviation computing means for computing an absolute deviation from a reference point of a current image by adding together the motion vectors detected by the motion-vector detecting means, first correcting means having a feedback loop and arranged to correct the image shake, second correcting means having a field memory and arranged to correct the image shake by using an image delayed by the field memory, and control means for varying the proportions of individual image-shake corrections to be performed by the first and second correcting means in an overall image-shake correction, on the basis of the absolute deviation from the reference point of the current image computed by the absolute-deviation computing means. The arrangement of a video camera which is an image pickup apparatus provided with the image-shake preventing device according to the eighth embodiment of the present invention is substantially identical to that of the previously-described second embodiment shown in FIG. 4, and the following description will be made with reference to FIG. 4 as well. FIG. 16 is a flowchart showing the operation of the logic operation circuit 120 provided in the image-shake preventing device according to the eighth embodiment. In Step S41, the logic operation circuit 120 reads the output signal of the motion-vector detecting circuit 118 (the horizontal and vertical components of a motion vector at a predetermined position in a picture) on a field-by-field basis. Then, the process proceeds to Step S42, in which the logic operation circuit 120 performs predetermined processing on the read plurality of motion vectors at positions in a plurality of fields, thereby computing one representative motion vector. The predetermined processing includes the process of evaluating the reliability of each of the motion vectors, the process of determining a target area to be controlled, and the like.

Then, the process proceeds to Step S43, in which the logic operation circuit 120 integrates the representative motion vector to find a deviation from a reference position in the picture (the amount of displacement of the image), thereby producing an image-shake correction signal. Then, the process proceeds to Step S44, in which the logic operation circuit 120 sets the control gain of each of the first and second correcting means to an optimum state on the basis of an absolute value (absolute deviation) of the deviation of the image obtained in Step S43. Then, the process proceeds to Step S45, in which image-shake correction by the control of the VAP control and image-shake correction by the field memory control are executed on the basis of the amount of image-shake correction which is the deviation of the image obtained in Step S43 and the control gains set in Step S44. After that, the logic operation circuit 120 brings the process to an end.

The processing of Step S44, which constitutes part of the gist of the present invention, will be described in more detail with reference to FIG. 17. FIG. 17 is a view of a conversion table which shows the allocation of the control gains with respect to the image deviation. In FIG. 17, the vertical axis and the horizontal axis represent a correction gain and the image deviation, respectively. As is apparent from FIG. 17, as the image deviation becomes larger, the proportion of the VAP control, i.e., the optical shake correction by the first correcting means, in an overall image-shake correction is made larger, while, as the image deviation becomes smaller, the proportion of the field memory control, i.e., the electronic shake correction by the second correcting means, in the overall image-shake correction is made larger. Accordingly, in Step S44 of FIG. 16, the control gains of the VAP control and the field memory control according to the absolute value of the image deviation are set in accordance with the conversion table of FIG. 17.

(Ninth Embodiment)

The ninth embodiment of the present invention will be described below with reference to FIG. 18. FIG. 18 is a view of a conversion table which shows the allocation of the control gains with respect to the image deviation in an image-shake preventing device according to the ninth embodiment of the present invention. In the ninth embodiment, the relation between the image deviation and the allocation of the control gains is made to vary not linearly as in the case of the eighth embodiment but in a manner expressed by an exponential function.

The other arrangement, operation, effects and advantages of the ninth embodiment are substantially identical to those of the eighth embodiment described previously, and description thereof is omitted.

(Tenth Embodiment)

Figure 19:
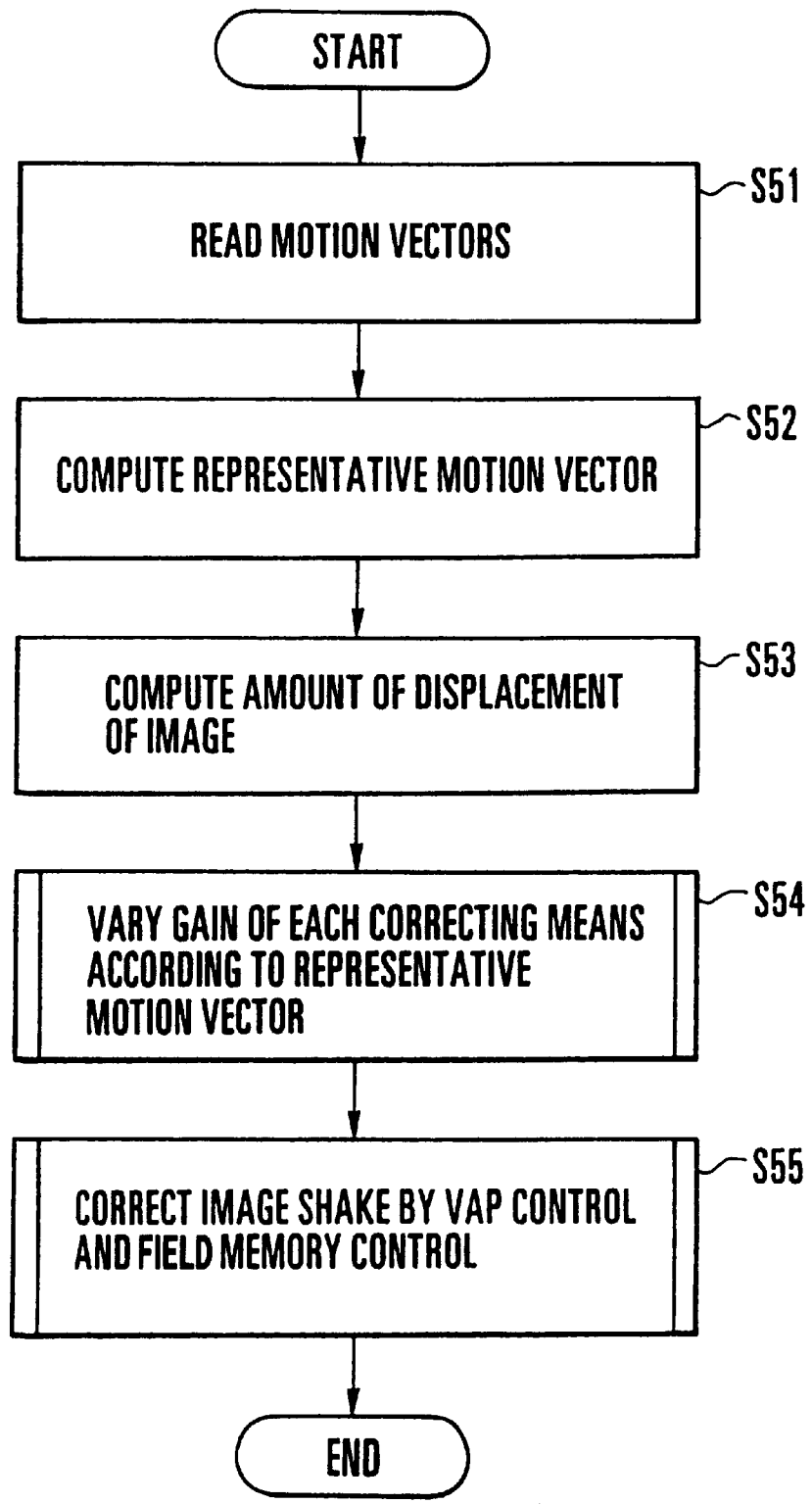
FIG. 19 is a flowchart showing the control operation of a logic operation circuit used in an image-shake preventing device according to a tenth embodiment of the present invention.
Figure 20:
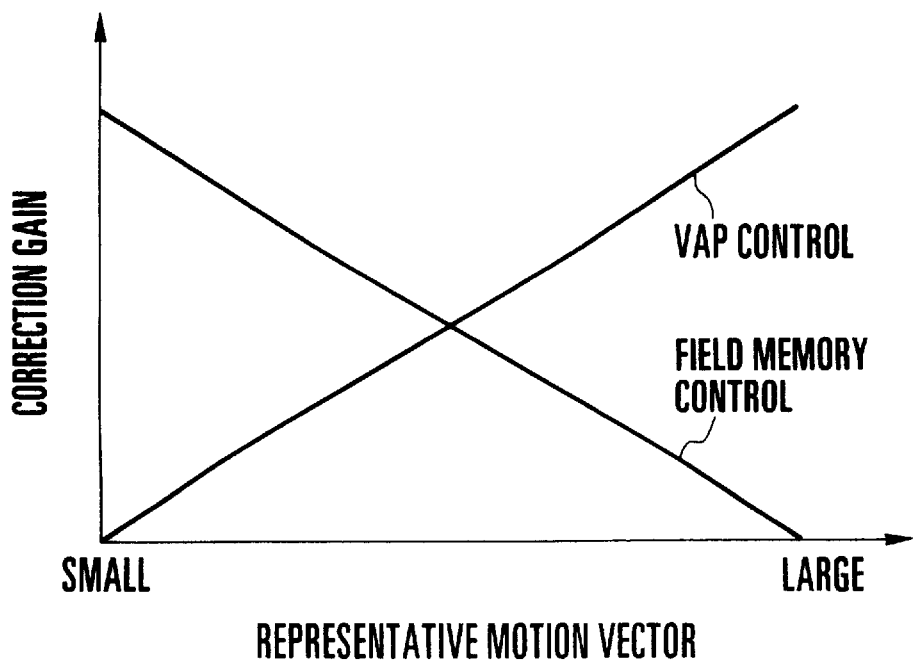
FIG. 20 is a view of a conversion table which is used in the image-shake preventing device according to the tenth embodiment and shows the allocation of the control gains of individual correcting means with respect to a representative motion-vector.

The tenth embodiment of the present invention will be described below with reference to FIGS. 19 and 20. The arrangement of a video camera which is an image pickup apparatus provided with an image-shake preventing device according to the tenth embodiment of the present invention is substantially identical to that of the previously-described second embodiment shown in FIG. 4, and the following description will be made with reference to FIG. 4 as well. FIG. 19 is a flowchart showing the operation of the logic operation circuit 120 provided in the image-shake preventing device according to the tenth embodiment. In Step S51, the logic operation circuit 120 reads the output signal of the motion-vector detecting circuit 118 (the horizontal and vertical components of a motion vector at a predetermined position in a picture) on a field-by-field basis. Then, the process proceeds to Step S52, in which the logic operation circuit 120 performs predetermined processing on the read plurality of motion vectors at positions in a plurality of fields, thereby computing one representative motion vector. The predetermined process includes the processing of evaluating the reliability of each of the motion vectors, the process of determining a target area to be controlled, and the like.

Then, the process proceeds to Step S53, in which the logic operation circuit 120 integrates the representative motion vector to find a deviation from a reference position in the picture (the amount of displacement of the image), thereby producing an image-shake correction signal. Then, the process proceeds to Step S54, in which the logic operation circuit 120 sets the control gain of each of the first and second correcting means to an optimum state on the basis of an absolute value of the representative motion vector obtained in Step S52. Then, the process proceeds to Step S55, in which image-shake correction by the VAP control and image-shake correction by the field memory control are executed on the basis of the amount of image-shake correction which is the deviation of the image obtained in Step S53 and the control gains set in Step S54. After that, the logic operation circuit 120 brings the process to an end.

The processing of Step S54, which constitutes part of the gist of the present invention, will be described in more detail with reference to FIG. 20. FIG. 20 is a view of a conversion table which shows the allocation of the control gains of the respective correcting means with respect to the representative motion vector. In FIG. 20, the vertical axis and the horizontal axis represent the correction (control) gain and the representative motion vector, respectively. As is apparent from FIG. 20, if the representative motion vector, i.e., the amplitude of a shake at a particular time instant is large, the proportion of the VAP control, i.e., the optical shake correction by the first correcting means, in an overall image-shake correction is made large, while, if the amplitude of a shake at a particular time instant is small, the proportion of the field memory control, i.e., the electronic shake correction by the second correcting means, in the overall image-shake correction is made large. Accordingly, in Step S54 of FIG. 19, the control gains of the VAP control and the field memory control according to the absolute value of the representative motion vector are set in accordance with the conversion table of FIG. 20.

According to the tenth embodiment, there is provided an image-shake preventing device which is arranged to detect a motion vector from an image signal and correct image shake in real time. The image-shake preventing device includes motion-vector detecting means for detecting motion vectors relative to temporally continuous images by performing a computation on a correlation between the temporally continuous images, first correcting means having a feedback loop and arranged to correct the image shake, second correcting means having a field memory and arranged to correct the image shake by using an image delayed by the field memory, and control means for varying the proportions of individual image-shake corrections to be performed by the first and second correcting means in an overall image-shake correction, on the basis of information indicative of the motion vectors relative to the temporally continuous images, which are detected by the motion-vector detecting means.

(Eleventh Embodiment)

Figure 21:
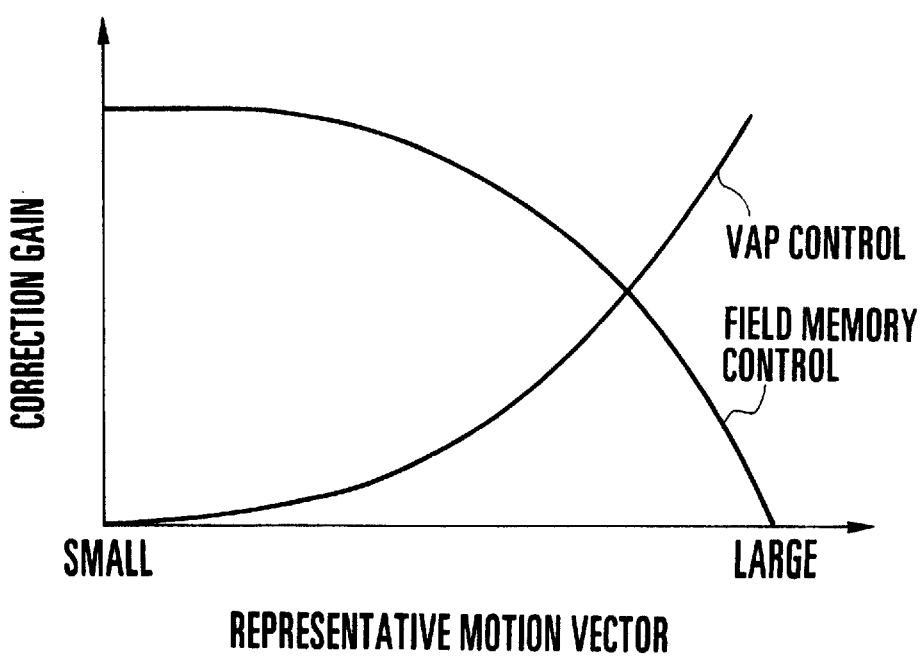
FIG. 21 is a view of a conversion table which is used in an image-shake preventing device according to an eleventh embodiment and shows the allocation of the control gains of individual correcting means with respect to a representative motion vector.

The eleventh embodiment of the present invention will be described below with reference to FIG. 21. FIG. 21 is a view of a conversion table which shows the allocation of the control gains of the respective correcting means with respect to the representative motion vector in an image-shake preventing device according to the eleventh embodiment of the present invention. In the eleventh embodiment, the relation between the representative motion vector and the allocation of the control gains is made to vary not linearly as in the case of the tenth embodiment but in a manner expressed by an exponential function.

The other arrangement, operation, effects and advantages of the eleventh embodiment are substantially identical to those of the tenth embodiment described previously, and description thereof is omitted.

According to any of the second to eleventh embodiments, it is possible to appropriately vary the respective control gains of the first and second correcting means so that the proportion of image-shake correction to be performed by the first correcting means in an overall image-shake correction, which means is capable of correcting an image shake of large amplitude, can be made large if the amount of an image shake at a particular time instant is large, while, if such an amount is small, the proportion of image-shake correction to be performed by the second correcting means in the overall image-shake correction can be made large, which means realizes a good correction characteristic capable of correcting an image shake of small amplitude. Accordingly, although a plurality of correcting means are combined, it is possible to readily and reliably effect flexible image-shake correction which can cope with various photographic states without causing degradation of a high-frequency characteristic, an excessive correction beyond an optimum correction range, or the like.

What is claimed is:

1. An image-shake correcting device comprising:
   (a) movement detecting means for detecting a relative movement between said image-shake correcting device and a subject;
   (b) optical correcting means for optically correcting a movement of an image on the basis of an output of said movement detecting means;
   (c) electronic correcting means for electronically correcting the movement of the image on the basis of the output of said movement detecting means; and
   (d) control means for controlling the optical correcting means and the electronic correcting means by selectively operating the optical correcting means and the electronic correcting means according to a direction of relative movement detected by said movement detecting means.

2. An image-shake correcting device according to claim 1, wherein said optical correcting means performs movement correction in a vertical direction of a picture, while said electronic correcting means performs movement correction in a horizontal direction of the picture.

3. An image-shake correcting device according to claim 1, further comprising image pickup means, said movement detecting means detecting a motion vector of the image from a pickup image signal output from said image pickup means.

4. An image-shake correcting device according to claim 1, wherein said optical correcting means includes a variable angle prism and displaces, on the basis of the output of said movement detecting means, a direction of an optical axis of said variable angle prism toward a direction in which the movement of the image is cancelled.

5. An image-shake correcting device according to 1, wherein said electronic correcting means includes an image memory and shifts, on the basis of the output of said movement detecting means, an image reading position in said image memory from which the image is read out, in a direction in which the movement of the image is cancelled.

* * * * *

UNITED STATES PATENT AND TRADEMARK OFFICE
CERTIFICATE OF CORRECTION

PATENT NO. : 5,982,421
DATED : November 9, 1999
INVENTOR(S) : KAZUYA INOU, ET AL.

It is certified that error appears in the above-identified patent and that said Letters Patent is hereby corrected as shown below:

<u>Column 4</u>

Line 29, "statue" should read --state--.

<u>Column 7</u>

Line 50, "contrary" should read --contrary,--.
    Line 55, "a" should read --an--.

UNITED STATES PATENT AND TRADEMARK OFFICE
CERTIFICATE OF CORRECTION

PATENT NO. : 5,982,421

DATED : November 9, 1999

INVENTOR(S): KAZUYA INOU, ET AL.

It is certified that error appears in the above-identified patent and that said Letters Patent is hereby corrected as shown below:

Column 14

Line 32, "process includes the processing" should read --processing includes the process--.

Column 15

Line 47, "The arrangement" (first occurrence) should read --are--.
Line 48, "are" should read --the arrangement--.

UNITED STATES PATENT AND TRADEMARK OFFICE
CERTIFICATE OF CORRECTION

PATENT NO. : 5,982,421

DATED : November 9, 1999

INVENTOR(S): KAZUYA INOU, ET AL.

It is certified that error appears in the above-identified patent and that said Letters Patent is hereby corrected as shown below:

Column 20

Line 31, after Claim 5 please insert Claims 6 through 21, as follows:

--6. A movement correcting device comprising:
    (a) movement detecting means for detecting a relative movement between said movement correcting device and a subject;
    (b) optical correcting means for optically correcting a movement of an image on the basis of an output of said movement detecting means;
    (c) electronic correcting means for electronically correcting the movement of the image on the basis of the output of said movement detecting means; and
    (d) control means for controlling a ratio of a correlation amount of the optical correcting means to a correlation amount of the electronic correction means to change according to a direction of relative movement detected by said movement detecting means.

UNITED STATES PATENT AND TRADEMARK OFFICE
CERTIFICATE OF CORRECTION

PATENT NO. : 5,982,421

DATED : November 9, 1999

INVENTOR(S): KAZUYA INOU, ET AL.

It is certified that error appears in the above-identified patent and that said Letters Patent is hereby corrected as shown below:

7. A movement correcting device according to Claim 6, wherein said optical correcting means performs movement correction in a vertical direction of a picture, while said electronic correcting means performs movement correction in a horizontal direction of the picture.

8. A movement correcting device according to Claim 6, further comprising image pickup means, said movement detecting means detecting a motion vector of the image from a pickup image signal output from said image pickup means.

9. A movement correcting device according to Claim 6, wherein said optical correcting means includes a variable angle prism and displaces, on the basis of the output of said movement detecting means, a direction of an optical axis of said variable angle prism toward a direction in which the movement of the image is cancelled.

10. A movement correcting device according to Claim 6, wherein said electronic correcting means includes an image memory and shifts, on the basis of the output of said movement detecting means, an image reading position in said image memory from which the image is read out, in a direction in which the movement of the image is cancelled.

UNITED STATES PATENT AND TRADEMARK OFFICE
CERTIFICATE OF CORRECTION

PATENT NO. : 5,982,421

DATED : November 9, 1999

INVENTOR(S): KAZUYA INOU, ET AL.

It is certified that error appears in the above-identified patent and that said Letters Patent is hereby corrected as shown below:

11. A camera apparatus comprising:
    a shake detecting sensor for detecting a shake of said camera apparatus;
    an optical correcting system for optically correcting a movement of an image due to the shake on the basis of an output of said shake detecting sensor;
    an electronic correcting circuit for electronically correcting the movement of the image due to the shake on the basis of the output of said shake detecting sensor; and
    a control circuit for selectively controlling an operation of said optical correcting system and an operation of said electronic correcting circuit on the basis of a direction of the image shake by said shake detecting sensor.

12. A camera apparatus according to Claim 11, further comprising an image pickup device, said shake detecting sensor detecting a motion vector of the image from a pickup image signal output from said image pickup device.

UNITED STATES PATENT AND TRADEMARK OFFICE
CERTIFICATE OF CORRECTION

PATENT NO. : 5,982,421

DATED : November 9, 1999

INVENTOR(S): KAZUYA INOU, ET AL.

It is certified that error appears in the above-identified patent and that said Letters Patent is hereby corrected as shown below:

13. A camera apparatus according to Claim 11, wherein said optical correcting system includes a variable angle prism and corrects the shake by displacing, on the basis of the output of said shake detecting sensor, a direction of an optical axis of said variable angle prism toward a direction in which the movement of the image due to the shake is cancelled.

14. A camera apparatus according to Claim 11, wherein said electronic correcting circuit includes an image memory and corrects the shake by shifting, on the basis of the output of said shake detecting sensor, an image reading position in said image memory from which the image is read out, in a direction in which the movement of the image due to the shake is cancelled.

15. A camera apparatus according to Claim 12, wherein said electronic correcting circuit stores a luminance signal and a chrominance signal output from said image pickup device, respectively, into separate memories to correct the shake.

UNITED STATES PATENT AND TRADEMARK OFFICE
CERTIFICATE OF CORRECTION

PATENT NO. : 5,982,421

DATED : November 9, 1999

INVENTOR(S): KAZUYA INOU, ET AL.

It is certified that error appears in the above-identified patent and that said Letters Patent is hereby corrected as shown below:

16. A camera apparatus according to Claim 12, wherein said shake detecting sensor includes a band-pass filter for converting a pickup image signal into a two-level signal and detects the motion vector on the basis of the two-level signal.

17. An image-shake correcting method, comprising steps of:
   (a) detecting a relative movement between said image-shake correcting device and a subject;
   (b) optically correcting a movement of an image on the basis of an output of said movement detecting means;
   (c) electronically correcting the movement of the image on the basis of the output of said movement detecting means; and
   (d) controlling the optical correcting step and the electronic correcting step to change a ratio of a correction amount of the optical correcting step and a correction amount of the electronic correcting step according to a direction of relative movement of the subject detected in said relative movement detecting step.

UNITED STATES PATENT AND TRADEMARK OFFICE
CERTIFICATE OF CORRECTION

PATENT NO. : 5,982,421

DATED : November 9, 1999

INVENTOR(S): KAZUYA INOU, ET AL.

It is certified that error appears in the above-identified patent and that said Letters Patent is hereby corrected as shown below:

18. An image-shake correcting method according to Claim 17, wherein said optical correcting step includes performing movement correction in a vertical direction of a picture, while said electronic correcting step includes performing movement correction in a horizontal direction of the picture.

19. An image-shake correcting method according to Claim 17, further comprising the step of picking-up an image, wherein said movement detecting step includes detecting a motion vector of an image from a pickup image signal generated in said image pickup step.

20. An image-shake correcting method according to Claim 17, wherein said optical correcting step includes using a variable angle prism and displacing, on the basis of the output in said movement detecting step, a direction of an optical axis of the variable angle prism toward a direction in which the movement of the image is cancelled.

UNITED STATES PATENT AND TRADEMARK OFFICE
CERTIFICATE OF CORRECTION

PATENT NO. : 5,982,421

DATED : November 9, 1999

INVENTOR(S): KAZUYA INOU, ET AL.

It is certified that error appears in the above-identified patent and that said Letters Patent is hereby corrected as shown below:

21. An image-shake correcting method according to Claim 17, wherein said electronic correcting step includes using an image memory and shifting, on the basis of the output in said movement detecting step, an image reading position in the image memory from which the image is read out, in a direction in which the movement of the image is cancelled.--

Signed and Sealed this

Ninth Day of January, 2001

*Attest:*

*Attesting Officer*

Q. TODD DICKINSON

*Commissioner of Patents and Trademarks*